(12) United States Patent
Genoway et al.

(10) Patent No.: US 10,562,419 B2
(45) Date of Patent: Feb. 18, 2020

(54) CHILD'S BOOSTER SEAT

(71) Applicant: Graco Children's Products Inc., Atlanta, GA (US)

(72) Inventors: Taylor Daniel Genoway, Atlanta, GA (US); Nicholas Henry Reaves, Marietta, GA (US); Joonho Na, Brookhaven, GA (US); Andrew Phillip Kitchens, Kennesaw, GA (US); Joshua William Gazaway, Mairetta, GA (US); Matthew Alan Morgenstern, West Chester, PA (US)

(73) Assignee: Graco Children's Products, Inc., Atlanta, GA (US)

( * ) Notice: Subject to any disclaimer, the term of this patent is extended or adjusted under 35 U.S.C. 154(b) by 134 days.

(21) Appl. No.: 15/680,475

(22) Filed: Aug. 18, 2017

(65) Prior Publication Data
US 2018/0050615 A1   Feb. 22, 2018

Related U.S. Application Data

(60) Provisional application No. 62/377,226, filed on Aug. 19, 2016, provisional application No. 62/415,091, filed on Oct. 31, 2016.

(51) Int. Cl.
*B60N 2/28* (2006.01)
(52) U.S. Cl.
CPC .... *B60N 2/2866* (2013.01); *B60N 2002/2896* (2013.01)
(58) Field of Classification Search
CPC .......... B60N 2/2866; B60N 2/26; B60N 2/28; B60N 2/2821; B60N 2002/2896

USPC .......................... 297/230.1, 250.1, 254, 255
See application file for complete search history.

(56) References Cited

U.S. PATENT DOCUMENTS

| | | | |
|---|---|---|---|
| 4,568,122 A | 2/1986 | Kain |
| 5,183,311 A | 2/1993 | Meeker et al. |
| 5,568,959 A | 10/1996 | Weber et al. |
| 5,599,060 A | 2/1997 | Stephens et al. |
| 5,609,367 A | 3/1997 | Eusebi et al. |

(Continued)

FOREIGN PATENT DOCUMENTS

| | | |
|---|---|---|
| AU | 2011200851 A1 | 9/2011 |
| CN | 205344587 U | 6/2016 |

(Continued)

*Primary Examiner* — Mark R Wendell
(74) *Attorney, Agent, or Firm* — Eversheds Sutherland (US) LLP

(57) ABSTRACT

A child's booster seat is provided and can include a booster seat base and seat back. The booster seat base can be collapsed or folded from an in-use configuration to a collapsed configuration to improve portability of the booster seat base. The booster seat base can include multiple seating surface panels that are rotatably coupled to one another to allow the booster seat base to be collapsed from an in-use width to a collapsed width that is less than the in-use width. The booster seat base can also be coupled and decoupled from the booster seat back. The booster seat base can include tab members that can be inserted into tab receiving cavities of the booster seat back. Adjustment of the booster seat base from the in-use configuration to the collapsed configuration can also facilitate removal of the tab members from the tab receiving cavities of the booster seat back.

20 Claims, 13 Drawing Sheets

(56) References Cited

U.S. PATENT DOCUMENTS

| | | | |
|---|---|---|---|
| 5,609,389 A | 3/1997 | Longoria et al. | |
| 5,797,654 A | 8/1998 | Stroud | |
| 5,816,652 A * | 10/1998 | Cone | B60N 2/2839 297/256.15 |
| 5,829,834 A | 11/1998 | Silverman | |
| 5,845,967 A * | 12/1998 | Kane | B60N 2/2806 297/250.1 |
| 6,079,772 A | 6/2000 | Green | |
| 6,079,780 A * | 6/2000 | Bapst | B60N 2/2806 116/200 |
| 6,139,101 A * | 10/2000 | Berringer | B60N 2/2821 297/256.1 |
| 6,390,345 B1 | 5/2002 | Brown et al. | |
| 6,692,072 B2 | 2/2004 | Nelson et al. | |
| 6,908,151 B2 | 6/2005 | Meeker et al. | |
| 7,004,362 B2 | 2/2006 | Boone | |
| 7,090,294 B2 | 8/2006 | Balensiefer, II et al. | |
| 7,188,899 B1 | 3/2007 | McClellan-Derrickson | |
| 7,229,132 B2 | 6/2007 | Meeker et al. | |
| 7,293,792 B2 | 11/2007 | Wilson | |
| 7,300,113 B2 | 11/2007 | Baloga et al. | |
| 7,374,241 B2 | 5/2008 | Gold et al. | |
| 7,422,276 B2 | 9/2008 | Flannery | |
| 7,488,038 B2 | 2/2009 | Boyle et al. | |
| 7,571,961 B2 | 8/2009 | Gold et al. | |
| 7,611,205 B2 | 11/2009 | Chen et al. | |
| 7,637,568 B2 | 12/2009 | Meeker et al. | |
| 7,748,788 B2 | 7/2010 | Yumoto et al. | |
| 7,837,267 B2 | 11/2010 | Zink et al. | |
| 7,850,236 B2 | 12/2010 | Chen et al. | |
| 7,857,385 B2 | 12/2010 | Zink et al. | |
| 8,182,034 B2 | 5/2012 | Glance | |
| D672,996 S | 12/2012 | Kelly | |
| 8,403,413 B2 | 3/2013 | Scott | |
| D696,523 S | 12/2013 | Presman et al. | |
| 8,646,838 B2 | 2/2014 | Fiore, Jr. et al. | |
| 8,678,499 B2 | 3/2014 | Kelly | |
| 9,332,815 B2 | 5/2016 | Sumroy et al. | |
| 9,376,088 B2 | 6/2016 | Sumroy | |
| 9,610,869 B1 * | 4/2017 | Holley, Jr. | B60N 2/2881 |
| 2002/0000744 A1 | 1/2002 | Maciejczyk | |
| 2003/0151282 A1 * | 8/2003 | Williams | B60N 2/2851 297/250.1 |
| 2003/0192925 A1 | 10/2003 | Boone | |
| 2004/0074937 A1 | 4/2004 | Thomas | |
| 2004/0100046 A1 | 5/2004 | Darling | |
| 2004/0195283 A1 | 10/2004 | Zebraski | |
| 2007/0236061 A1 | 10/2007 | Meeker et al. | |
| 2008/0135593 A1 | 6/2008 | Munther | |
| 2008/0277984 A1 | 11/2008 | Carine | |
| 2012/0175922 A1 * | 7/2012 | Gillett | B60N 2/2821 297/188.01 |
| 2012/0292963 A1 | 11/2012 | Sedlack | |
| 2013/0200671 A1 * | 8/2013 | Herzberg | B60N 2/28 297/250.1 |
| 2013/0300169 A1 | 11/2013 | Lu et al. | |
| 2014/0152072 A1 | 6/2014 | Sumroy | |
| 2015/0052709 A1 | 2/2015 | Sumroy | |
| 2017/0282758 A1 * | 10/2017 | Mitchell | B60N 2/2866 |
| 2018/0194252 A1 * | 7/2018 | Sack | B60N 2/2812 |

FOREIGN PATENT DOCUMENTS

| | | |
|---|---|---|
| EP | 2077082 B1 | 8/2010 |
| EP | 2311685 A3 | 5/2016 |
| FR | 2990900 A1 | 11/2013 |
| GB | 2456152 A | 7/2009 |
| GB | 2474438 A | 4/2011 |
| GB | 2478783 A | 9/2011 |
| GB | 2527137 A | 12/2015 |
| GB | 2532946 A | 6/2016 |
| WO | 2005/079159 A2 | 9/2005 |

\* cited by examiner

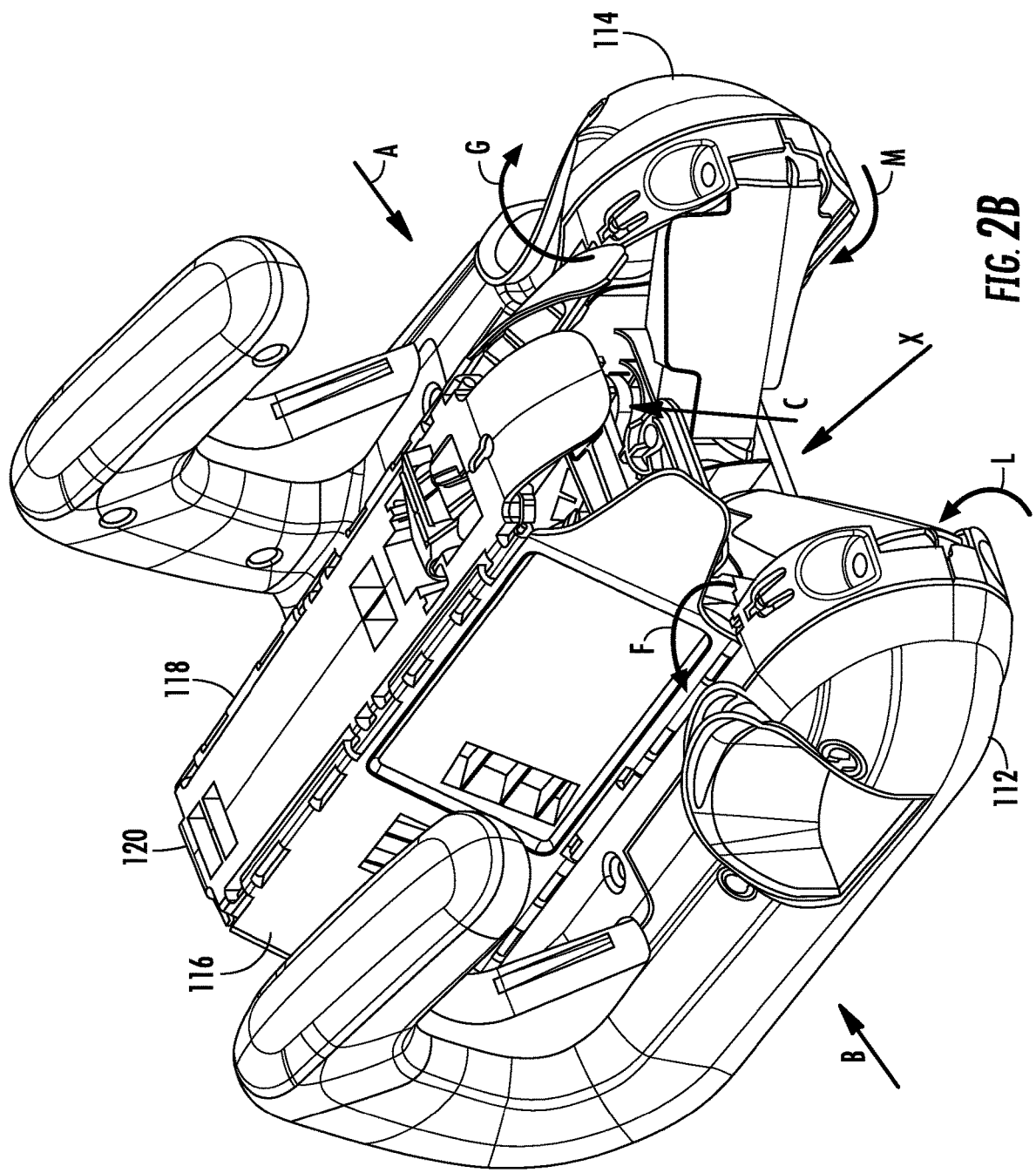

CHILD'S BOOSTER SEAT

RELATED APPLICATIONS

This application claims priority under 35 U.S.C. § 119 to U.S. Provisional Patent Application No. 62/377,226 filed Aug. 19, 2016, and titled "Portable Children's Booster Seat," and to U.S. Provisional Patent Application No. 62/415,091 filed Oct. 31, 2016, and titled "Child's Booster Seat with Improved Detachable Seat Back," the entire contents of each of which are hereby incorporated herein by reference for all purposes.

FIELD OF THE DISCLOSURE

The present disclosure is generally directed to child safety seats and more particularly to a child safety seat or booster seat with a seat base and seat back in which the seat base is removable from the seat back and/or the seat base is collapsible from an in-use configuration to a collapsed configuration.

BACKGROUND

Child safety seats are well known in the art. The typical child safety seat is designed to rest on the top surface of the seat of a vehicle. The child safety seat is configured for the child to sit on the child safety seat such that the position of the child is raised in the vehicle at a height above the top surface of the seat of the vehicle. Many of these types of child safety seats are booster seats for toddlers. Commonly, booster seats have a seat base and a seat back. The typical booster seat rests on the vehicle seat but the vehicle's safety harness (e.g., seatbelt) is used to secure the seat occupant (e.g., a child) in the booster seat as well as the seat the booster seat sits on. The seat back on some booster seats is removable, converting the seat to a seat base-only booster for larger children. The booster seat not only more closely fits the child's smaller body size, but also elevates the child to aide in properly positioning the child with respect to the seatbelt.

Conventional booster seats that include a removable seat back must be removed from the seat of the vehicle in order to switch between seat base only and seat base and seat back configurations. For example, in order to switch between configurations, these conventional booster seats require access to a part of the booster seat (either the seat base, seat back or both) that is not accessible while the conventional booster seat is positioned on the seat of the vehicle for use. Instead, a user may be required to lift and/or rotate the booster seat up and away from the top surface of the seat of the vehicle to gain access to the release. In other conventional booster seats, the user may be required to rotate the seat back relative to the seat base in order to separate the seat back from the seat base or to recouple the seat back to the seat base. This is not possible while the booster seat is placed on the top surface of the seat of the vehicle for use.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 2A-2C are various views of the collapsible child booster seat of FIGS. 1A-E in the process of being adjusted from the unfolded, in-use configuration to the folded configuration, in accordance with one example embodiment of the disclosure.

DETAILED DESCRIPTION OF THE EXAMPLE EMBODIMENTS

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Certain relationships between dimensions of the child booster seat and between features of the child booster seat are described herein using the term "substantially." As used herein, the term "substantially" indicates that each of the described dimensions or linear descriptions is not a strict boundary or parameter and does not exclude functionally similar variations therefrom. Unless context or the description indicates otherwise, the use of the term "substantially" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

As used herein, the term "substantially parallel" indicates that the parallel relationship is not a strict relationship and does not exclude functionally similar variations therefrom. As used herein the term "substantially perpendicular" indicates that the perpendicular relationship between two or more elements of the child booster seat are not a strict relationship and does not exclude functionally similar variations therefrom.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Figure 1A:
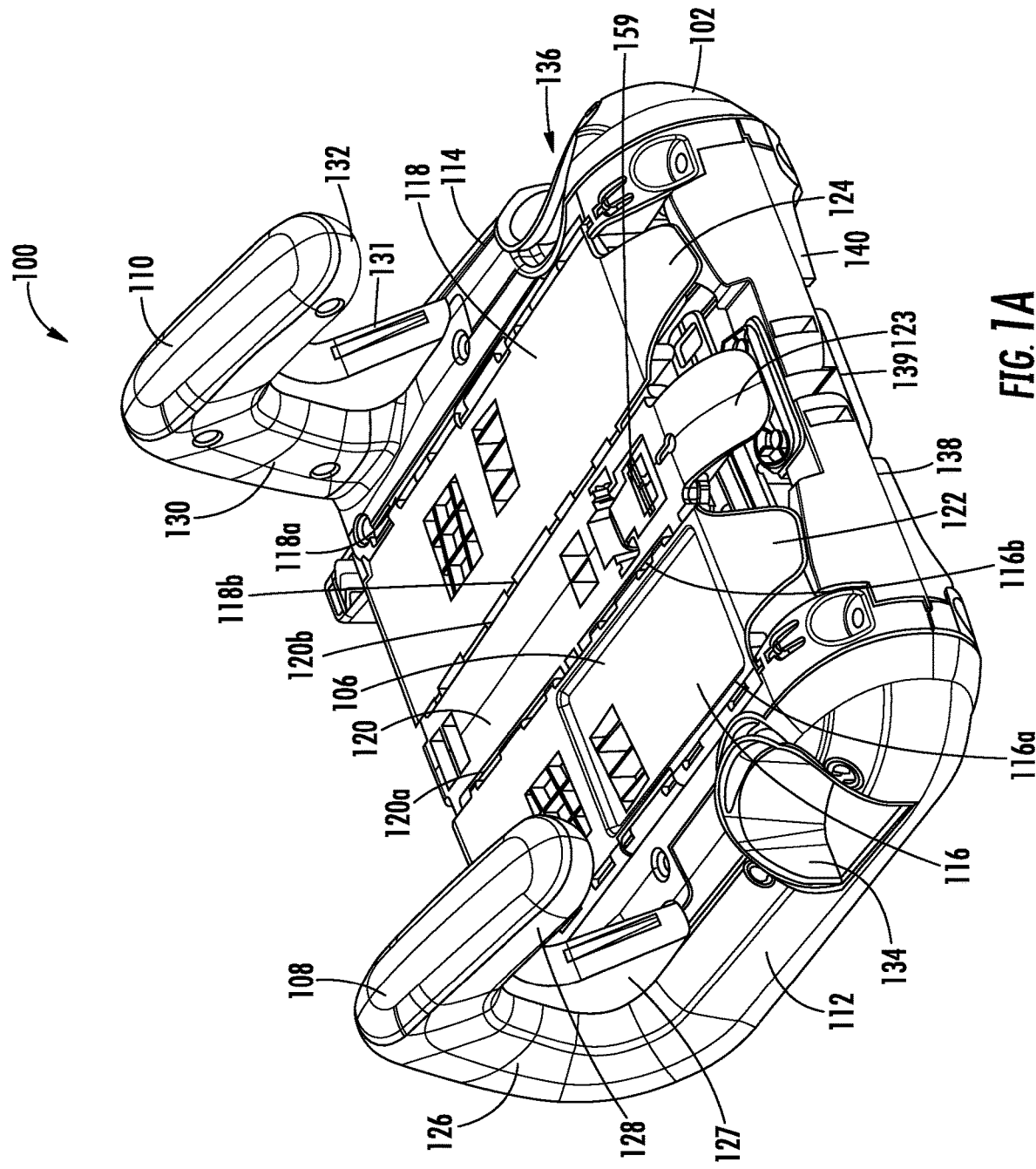
FIG. 1A is a perspective view of one example of a collapsible child booster seat base in the unfolded, in-use configuration and constructed in accordance with one example embodiment of the disclosure.
Figure 1B:
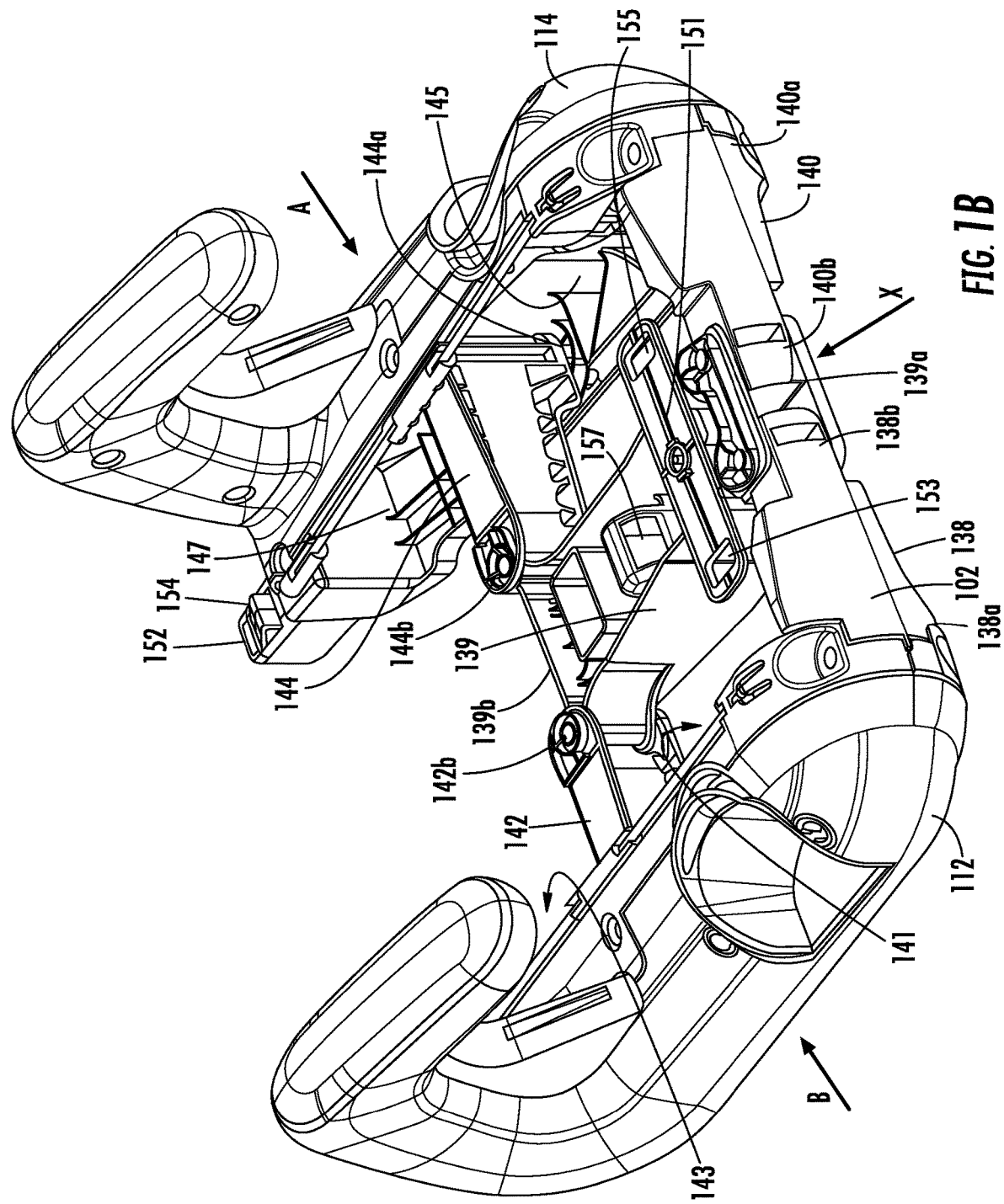
FIG. 1B is a partial deconstructed view of the collapsible child booster seat base of FIG. 1A in the unfolded, in-use configuration and constructed in accordance with one example embodiment of the disclosure.
Figure 1C:
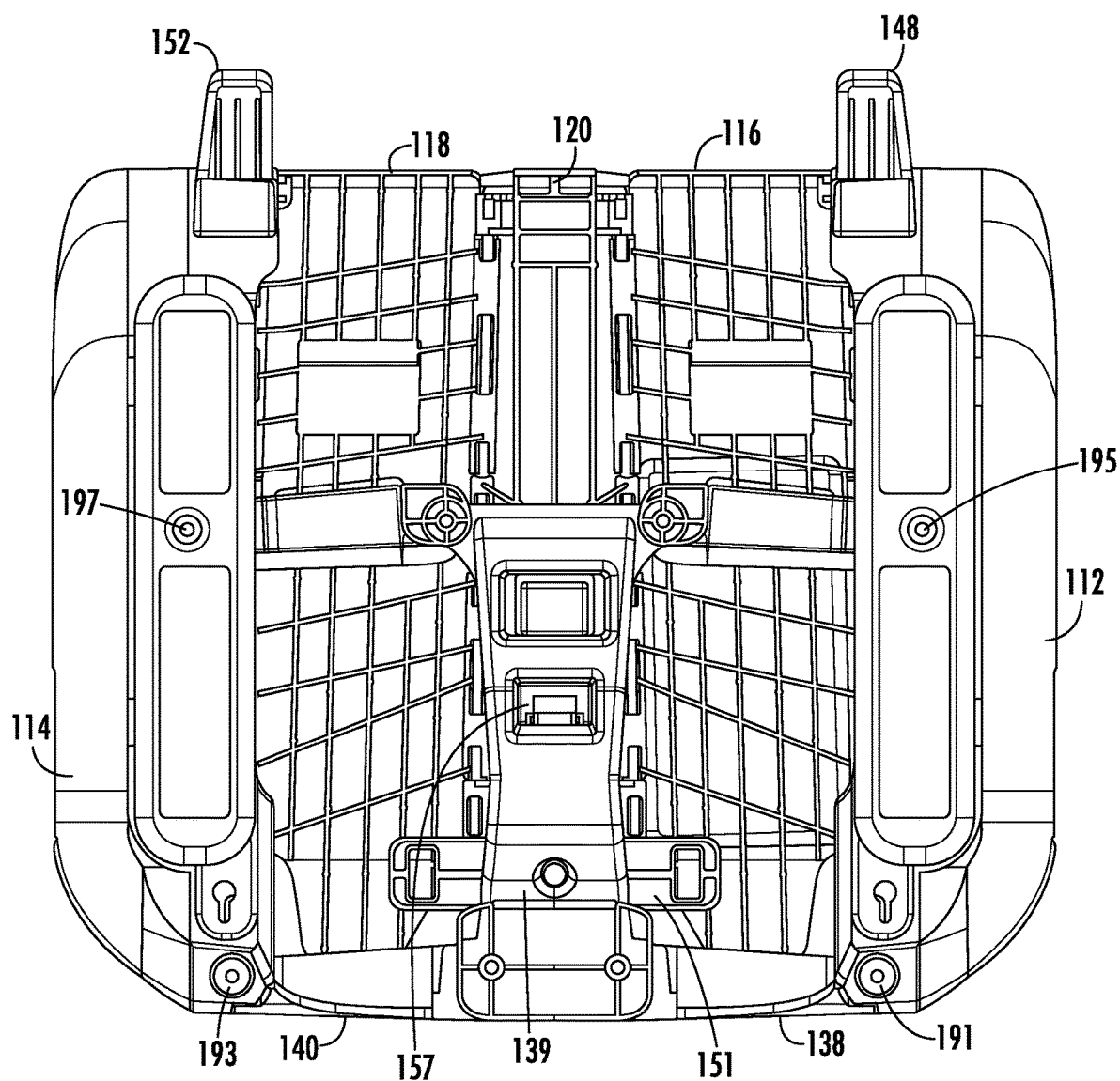
FIG. 1C is a bottom plan view of the collapsible child booster seat base of FIG. 1A in the unfolded, in-use configuration and constructed in accordance with one example embodiment of the disclosure.
Figure 1D:
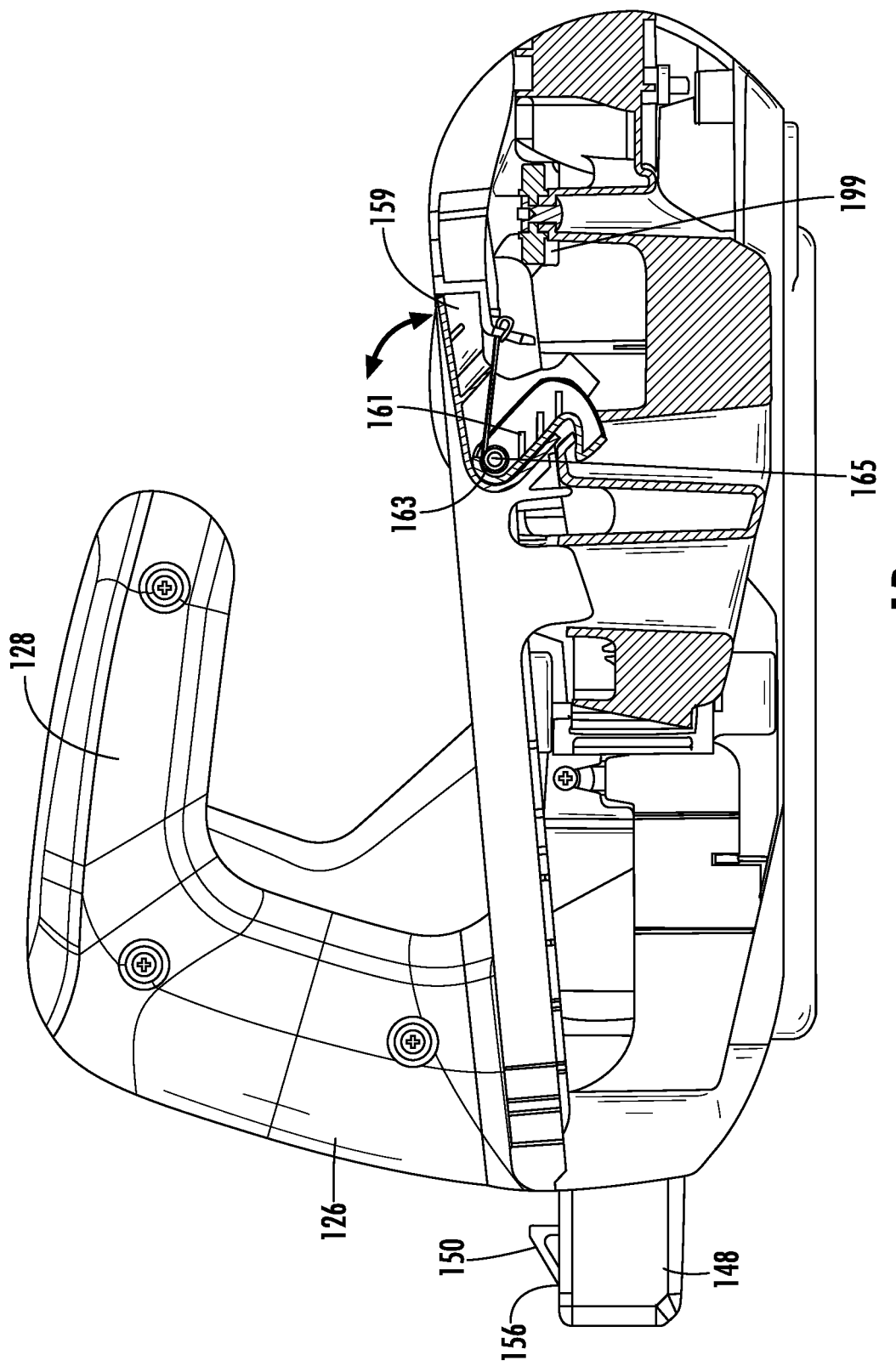
FIG. 1D is a side, partial cross-sectional view of the collapsible child booster seat base of FIG. 1A in the unfolded, in-use configuration and constructed in accordance with one example embodiment of the disclosure.
Figure 1E:
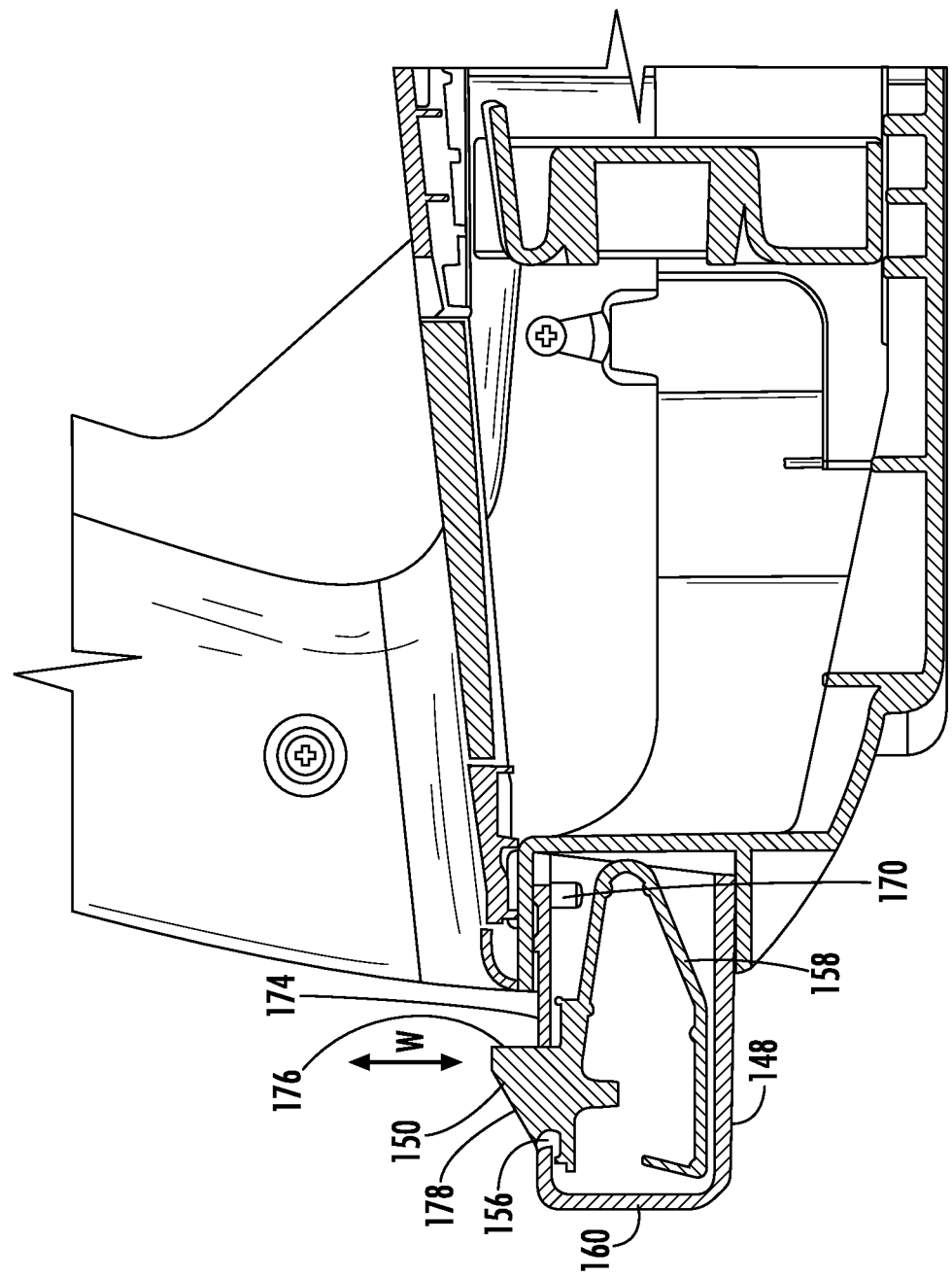
FIG. 1E is a partial cross-sectional view of one of the connecting tab members of the collapsible child booster seat base of FIG. 1A constructed in accordance with one example embodiment of the disclosure.

FIGS. 1A-B are perspective views of one example of a collapsible or foldable child booster seat base 100 in an uncollapsed or unfolded, in-use configuration in accordance with one example embodiment of the disclosure. FIG. 1C is a bottom plan view of the collapsible child booster seat base 100 of FIG. 1A shown in an uncollapsed, in-use configuration, in accordance with one example embodiment of the disclosure. FIGS. 1D-E are side, partial cross-sectional views of the collapsible child booster seat base 100 of FIG. 1A, shown in the uncollapsed, in-use configuration, in accordance with one example embodiment of the disclosure.

Referring now to FIGS. 1A-E, the example collapsible child booster seat base 100 can include a seat support frame 102 and a seating surface 106 disposed generally above or alongside the seat support frame 102. The booster seat base 100 can also include a first armrest 108 coupled to the seat support frame 102 and a second armrest 110 coupled to the seat support frame 102. Each of the first 108 and second 110 armrests can extend from the seat support frame 102 to a position higher than the seating surface 106 when the booster seat base 100 is in the uncollapsed, in-use configuration, as shown in FIG. 1A.

In certain example embodiments, the seat support frame 102 can be collapsible or foldable from an in-use configuration to a collapsed configuration. The collapsible seat support frame 102 can include a first side base 112 extending generally along one lateral side of the booster seat base 100 and the seat support frame 102, and a second side base 114 extending generally along a second lateral side of the booster seat base 100 and the seat support frame 102. Each of the first side base 112 and the second side base 114 can be constructed from a single member or multiple members. In one example embodiment, each of the first side base 112 and second side base 114 are constructed from multiple pieces of molded plastic that are coupled to one-another. Materials other than plastic or used with portions that are plastic may also be used in the construction of the first side base 112 and the second side base 114. However, in alternate embodiments, each of the first side base 112 and second side base 114 can be constructed of a single unitary piece of plastic or other materials.

The collapsible seat support frame 102 can further include a first rotating member 138 and a second rotating member 140. The first rotating member 138 can have a first portion (e.g., at or adjacent a first end 138a of the first rotating member 138) rotatably coupled to the first side base 112 at 191 and a distal second portion (e.g., at or adjacent a distal second end 138b of the first rotating member 138) rotatably coupled to a first end 139a of a center link member 139. In one example embodiment, the first end 138a of the first rotating member 138 is configured to rotate about a first vertical or substantially vertical axis defined by an axis through the attachment point 191 of the first rotating member 138 and the first side base 112 and the second end 138b of the first rotating member 138 is configured to rotate about a second vertical or substantially vertical axis defined by an axis through the attachment point of the first rotating member 138 and the center link member 139. In one example embodiment, the first axis and the second axis are parallel or substantially parallel to one another.

The center link member 139 can be an elongated member including a first end 139a positioned at or adjacent the front end of the booster seat base 100 and a distal second end 139b. The center link member 139 can also include a hollowed out portion defining one or more cavities and positioned between the first end 139a and the second end 139b. The center link member 139 can also include a hook catch member 157 positioned between the first end 139a and the second end 139b. The hook catch member 157 can include a cavity for receiving therein at least a portion of a hook 161 and a horizontally extending stop member that the hook 161 can abut or contact to prevent the hook 161 from being removed from the cavity when the booster seat base 100 is in use.

The booster seat base 100 can also include a retaining tab 151. In one example, the retaining tab 151 can be coupled to the center link member 139 along a top side of the center link member 139. The retaining tab 151 can be an elongated member with a first aperture 153 adjacent a first end and a second aperture 155 adjacent a second distal end. The retaining tab 151 can be coupled near its center with the first and second ends being free ends that allow it to act like a leaf spring with a spring bias along each end near the first 153 and second 155 apertures. The first side base 112 can include a first tab member (not shown) that can extend down from a top end of the first side base 112 along its interior side. The first tab member can be configured to engage and have at least a portion of the first tab member be inserted into the first aperture 153 when the booster seat base 100 is adjusted from an in-use configuration to a collapsed configuration. The second side base 114 can include a second tab member 199 that can extend down from a top end of the second side base 114 along its interior side. The second tab member 199 can be configured to engage and have at least a portion of the second tab member 199 be inserted into the second aperture 155 when the booster seat base 100 is adjusted from an in-use configuration to a collapsed configuration. The engagement of the first tab member in the first aperture 153 and the second tab member 199 in the second aperture 155 helps prevent the booster seat base 100 from self-adjusting from the collapsed configuration to the in-use configuration. The spring-biased nature of the retaining tab 151 allows a user to provide a minimum of force to pull the first side base 112 in the direction A and the second side base 114 in the direction B, which cause the ends of the retaining tab 151 to flex downward under force by the first tab member and the second tab member 199 and allow the first tab member to exit the first aperture 153 and the second tab member 199 to exit the second aperture 155 to allow the booster seat base 100 to be adjusted from the collapsed configuration to an in-use configuration.

The second rotating member 140 can have a first portion (e.g., at or adjacent a first end 140a) rotatably coupled to the second side base 114 at point 193 and a distal second portion (e.g., at or near a distal second end 140b) rotatably coupled to the first end 139a of the center link member 139. In one example embodiment, the first end 140a of the second rotating member 140 is configured to rotate about a third vertical or substantially vertical axis defined by an axis though the attachment point 193 of the first end 140a of the second rotating member 140 and the second side base 114 and the second end 140b of the second rotating member 140 is configured to rotate about a fourth vertical or substantially vertical axis defined by an axis through the attachment point of the second rotating member 140 and the center link member 139. In one example embodiment, the first axis, second axis, third axis, and fourth axis are parallel or substantially parallel to one another.

In certain example embodiments, the first rotating member 138 can be rotatably coupled to the first side base 112 and the second rotating member 140 can be rotatably coupled to the second side base 114 via a hinge, a pin, or other rotating means. Further, the first rotating member 138 and the second rotating member 140 can each be rotatably coupled to the center link member 139 via a hinge, a pin, or other rotating means. Each of the first rotating member 138 and second rotating member 140 can be configured to rotate from an in-use configuration (as shown in FIG. 1B), to a collapsed configuration, wherein the second ends 138b, 140b of each of the first rotating member 138 and the second rotating member 140 are closer to the corresponding first side base 112 and second side base 114 in the collapsed configuration as compared to the in-use configuration. For example, the first side base 112 can include a first interior cavity 141 for receiving all or a portion of the first rotating member 138 in the collapsed configuration and the second side base 114 can include a second interior cavity 145 for receiving all or a portion of the second rotating member 140 in the collapsed configuration.

The collapsible seat support frame 102 can further include a third rotating member 142 and a fourth rotating member 144. The third rotating member 142 can have a first portion (e.g., at or adjacent a first end 142a of the third rotating member 142) rotatably coupled to the first side base 112 at point 195 and a distal second portion (e.g., at or adjacent a distal second end 142b of the third rotating member 142) rotatably coupled to the second end 139b of the center link member 139. In one example embodiment, the first end 142a of the third rotating member 142 is configured to rotate about a fifth vertical or substantially vertical axis defined by an axis though the attachment point 195 of the third rotating member 142 and the first side base 112 and the second end 142b of the third rotating member 142 is configured to rotate about a sixth vertical or substantially vertical axis defined by an axis through the attachment point of the third rotating member 142 and the second end 139b of the center link member 139. In one example embodiment, the first axis, second axis, third axis, fourth axis, fifth axis, and the sixth axis are parallel or substantially parallel to one another.

The fourth rotating member 144 can have a first portion (e.g., at or adjacent a first end 144a) rotatably coupled to the second side base 114 at point 197 and a distal second portion (e.g., at or near a distal second end 144b) rotatably coupled to the second end 139b of the center link member 139. In one example embodiment, the first end 144a of the fourth rotating member 144 is configured to rotate about a seventh vertical or substantially vertical axis defined by an axis though the attachment point 197 of the fourth rotating member 144 and the second side base 114 and the second end 144b of the fourth rotating member 144 is configured to rotate about an eighth vertical or substantially vertical axis defined by an axis through the attachment point of the second end 144b of the fourth rotating member 144 and the center link member 139. In one example embodiment, the first axis, second axis, third axis, fourth axis, fifth axis, sixth axis, seventh axis, and eighth axis are parallel or substantially parallel to one another.

In certain example embodiments, the third rotating member 142 can be rotatably coupled to the first side base 112 and the fourth rotating member 144 can be rotatably coupled to the second side base 114 via a hinge, a pin, or other rotating means. Further, the third rotating member 142 and the fourth rotating member 144 can each be rotatably coupled to the second end 139b of the center link member 139 via a hinge, a pin, or other rotating means. Each of the third rotating member 142 and fourth rotating member 144 can be configured to rotate from an in-use configuration (as shown in FIG. 1B), to a collapsed configuration, wherein the second ends 142b, 144b of each of the third rotating member 142 and the fourth rotating member 144 are closer to the corresponding first side base 112 and second side base 114 in the collapsed configuration as compared to the in-use configuration. For example, the first side base 112 can include a third interior cavity 143 for receiving all or a portion of the third rotating member 142 in the collapsed configuration and the second side base 114 can include a fourth interior cavity 147 for receiving all or a portion of the fourth rotating member 144 in the collapsed configuration. The example first rotating member 138, second rotating member 140, third rotating member 142, and fourth rotating member 144 can each be an elongated member having a longitudinal axis that extends in a direction of the first side base 112 towards the second side base 114 and can be constructed of plastic, metal, composite, or metal alloy.

In one example embodiment, as the seat support frame 102 is adjusted from an in-use configuration to a collapsed configuration, the first side base 112 can move in the direction B towards the second side base 114 and/or the second side base 114 can move in the direction A towards the first side base 112. While the example embodiment of FIG. 1B shows and describes two sets of corresponding rotating members 138, 140 and 142, 144, in other example embodiments only one set may be used or more than two sets may be used. Further, while the first set of rotating members 138, 140 are shown as each being coupled adjacent corresponding front ends of the first side base 114 and the second side base 114 and the second set of rotating members 142, 144 are shown as each being coupled adjacent corresponding middle sections of the first side base 112 and the second side base 114, this is for example purposes only as each set may be coupled along other portions of the first side base 112 and second side base 114.

The first armrest 108 can include a vertical support member 126 and a horizontal support member 128. The vertical support member 126 can include a first end coupled to the first side base 112 and a distal second end coupled to the horizontal support member 128. The vertical support member 126 can extend generally vertically upward from the first end to the second end. The horizontal support member 128 can extend in a direction generally horizontal to a vehicle seat or other seat upon which the seat base 100 is placed. The horizontal support member 128 can be configured to receive an arm resting upon the top end of the horizontal support member 128. Further, while not shown, the horizontal support member 128 can also include padding and other soft goods (e.g., fabric, leather, soft plastic, etc.) disposed along at least a portion of a top side of the horizontal support member 128. In one example embodiment, the vertical support member 126 and horizontal support member 128 can be constructed as a unitary piece from materials such as plastic, metal, composite, or metal alloy.

The booster seat base 100 can also include a first lap belt guide 127. In one example, the first lap belt guide 127 can extend between the vertical support member 126 and the first side base 112 and can include an angularly disposed guide edge that extends from the top end of the vertical support member 126 or a bottom side of the horizontal support member 128 to the first side base 112. The first lap belt guide 127 is configured to position the lap belt of a vehicle seat belt in the proper position about the lap of a child sitting on the booster seat base 100.

The second armrest 110 can include a vertical support member 130 and a horizontal support member 132. The vertical support member 130 can include a first end coupled to the first side base 114 and a distal second end coupled to the horizontal support member 132. The vertical support member 130 can extend generally vertically upward from the first end to the second end. The horizontal support member 132 can extend in a direction generally horizontal to a vehicle seat or other seat upon which the seat base 100 is placed. The horizontal support member 132 can be configured to receive an arm resting upon the top end of the horizontal support member 132. Further, while not shown, the horizontal support member 132 can also include padding and/or other soft goods (e.g., fabric, leather, soft plastic, etc.) disposed along at least a portion of a top side of the horizontal support member 132. In one example embodiment, the vertical support member 130 and horizontal support member 132 can be constructed as a unitary piece from materials such as plastic, metal, composite, or metal alloy.

The booster seat base 100 can also include a second lap belt guide 131. In one example, the second lap belt guide 131 can extend between the vertical support member 130 and the second side base 114 and can include an angularly disposed guide edge that extends from the top end of the vertical support member 130 or a bottom side of the horizontal support member 132 to the second side base 114. The second lap belt guide 131 is configured to position the lap belt of a vehicle seat belt in the proper position about the lap of a child sitting on the booster seat base 100.

In certain example embodiments, each of the first 127 and second 131 lap belt guides creates a transition surface between a forward surface of the vertical member 126, 130 of the armrest 108 and the seating members 116, 118, 120 of the booster seat base 100 for properly positioning the lap belt. In some example embodiments, each lap belt guide 127, 131 may be attached to or integrally formed as a part of the vertical member 126, 130 of the armrest 108, 110. In other examples, each lap belt guide 127, 131 may be attached to or integrally formed with at least a portion of the booster seat base 100. In another example embodiment, elements of the booster seat base 100 and vertical member 126, 130 of each armrest 108, 110 may combine to create the respective seat belt guides 127, 131. Each lap belt guide 127, 131 may include a flat surface that the lap seatbelt extends over and abuts, or the lap belt guide 127, 131 may include additional features to secure or otherwise direct the lap seatbelt.

The seating surface 106 can include two or more seating members. In one example, as shown in FIG. 1A, the seating surface 106 can include three seating members 116, 118, 120. In other example embodiments, the seating surface 106 can include two seating members where the two seating members could operate substantially the same as that described with reference to seating members 116 and 118 below except that the alternative two seating members and could be rotatably coupled to one another rather than the removed seating member 120, as discussed below. Each seating member 116, 118, 120 can have a flat, substantially flat, or curved (e.g., convex) top surface. In one example embodiment, each of the seating members 116, 118, 120 are constructed from plastic and molded into the desired shape. Alternatively, each of the seating members 116, 118, 120 can be constructed of another material. Further, while not shown, each of the seating members 116, 118, 120 can also include padding and/or other soft goods (e.g., fabric, leather, soft plastic, etc.) disposed along at least a portion of the top surface of each corresponding seating member 116, 118, 120.

In one example embodiment, a first seating member 116 can extend generally from the front end of the seat base 100 towards the rear end of the seat base 100. The first seating member 116 can be rotatably coupled along a first lateral edge 116a to the first side base 112 and can be rotatably coupled along an opposing second lateral edge 116b to the third seating member 120. In one example embodiment, the first seating member 116 can be configured to rotate about an axis disposed generally along the first lateral edge 116a and defined by the coupling of the first seating member 116 to the first side base 112. In one example, the first seating member 116 can be rotatably coupled to the first side base 112 via a pin, axle, hinge, or other rotating means known to those of ordinary skill in the art. In addition, the first seating member 116 can be rotatably coupled to the third seating member 120 via a pin, axle, hinge, or other rotating means known to those of ordinary skill in the art. In certain example embodiments, the first seating member 116 can also include a leg support member 122 coupled to the first seating member 116. In one example, the leg support 122 can be coupled adjacent the front end of the first seating member 116. In certain example embodiments, the leg support 112 can be a curved member configured to extend off of the front end of the seat base 100 and support the back-side knee area of a child. In certain example embodiments, the leg support member 122 can be integrally formed with the first seating member 116. In certain example embodiments, each of the first seating member 116 and the leg support member 122 are made of plastic. However, other materials known to those of ordinary skill in the art, including but not limited to, metal, composites, or metal alloys, may be substituted for plastic.

In one example embodiment, a second seating member 118 can extend generally from the front end of the seat base 100 towards the rear end of the seat base 100. The second seating member 118 can be rotatably coupled along a first lateral edge 118a to the second side base 114 and can be rotatably coupled along an opposing second lateral edge 118b to the third seating member 120. In one example embodiment, the second seating member 118 can be configured to rotate about an axis disposed generally along the first lateral edge 118a and defined by the coupling of the second seating member 118 to the second side base 114. In one example, the second seating member 118 can be rotatably coupled to the second side base 114 via a pin, axle, hinge, or other rotating means known to those of ordinary skill in the art. In addition, the second seating member 118 can be rotatably coupled to the third seating member 120 via a pin, axle, hinge, or other rotating means known to those of ordinary skill in the art. In certain example embodiments, the second seating member 118 can also include a leg support member 124 coupled to the second seating member 118. In one example, the leg support 124 can be coupled adjacent the front end of the second seating member 118. In certain example embodiments, the leg support member 124 can be a curved member configured to extend off of the front end of the seat base 100 and support a back side of a second knee area of a child. In certain example embodiments, the leg support member 124 can be integrally formed with the second seating member 118. In certain example embodiments, each of the second seating member 118 and the leg support member 124 are made of plastic. However, other materials known to those of ordinary skill in the art, including but not limited to, metal, composites, or metal alloys, may be substituted for plastic.

In example embodiments that include a third seating member 120, the third seating member 120 can extend generally from the front end of the seat base 100 towards the rear end of the seat base 100. The third seating member 120 can be rotatably coupled along a first lateral edge 120*a* to the first seating member 116 and can be rotatably coupled along an opposing second lateral edge 120*b* to the second seating member 118. In one example, the third seating member 120 can be rotatably coupled to the first seating member 116 via a pin, axle, hinge, or other rotating means known to those of ordinary skill in the art. In addition, the third seating member 120 can be rotatably coupled to the second seating member 118 via a pin, axle, hinge, or other rotating means known to those of ordinary skill in the art. In certain example embodiments, the third seating member 120 can also include a leg support member 123 coupled to the third seating member 120. In one example, the leg support member 123 can be coupled adjacent the front end of the third seating member 120. In certain example embodiments, the leg support member 123 can be a curved member configured to extend off of the front end of the seat base 100 and support a back side of a knee area of a child. In certain example embodiments, the leg support member 123 can be integrally formed with the third seating member 120. In certain example embodiments, each of the third seating member 120 and the leg support member 123 are made of plastic. However, other materials known to those of ordinary skill in the art, including but not limited to, metal, composites, or metal alloys, may be substituted for plastic. In one example embodiment, each of the first seating member 116, second seating member 118, and third seating member 120 can have a smooth or substantially smooth top surface.

Figure 2A:
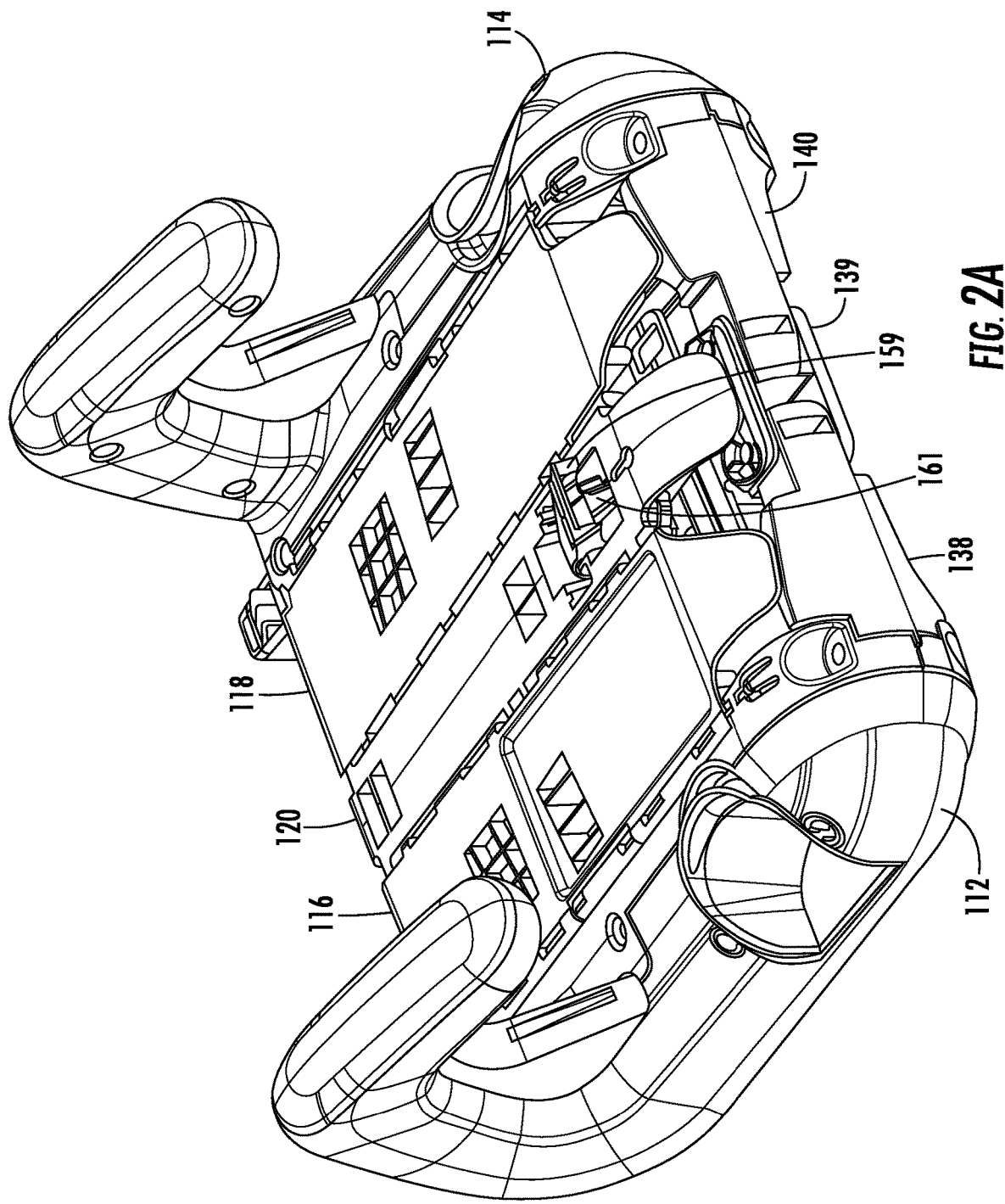

The collapsible child booster seat base 100 can also include an adjustable seat locking lever 159. The seat locking lever 159 can include a free end that is positioned along a surface of one of the seating members 116, 118, 120. In one example, the seat locking lever 159 can be positioned along a third seating member 120. For example, the third seating member 120 can include an opening configured to receive at least a portion of the seat locking lever 159. The seat locking lever 159 can include or can be coupled to a locking hook 161 that includes a curved member for engaging other members. The locking hook 161 can be configured to rotatably engage and disengage from the hook catch member 157 in the center link member 139. For example, the seat locking lever 159 and the locking hook 161 can be coupled to the third seating member 120 by a hinge pin, axle or other hinge means and can be configured to rotate in the counter-clockwise and clockwise directions, as shown in FIG. 1D, from a locked position (as shown in FIG. 1D) to an unlocked position (as shown in FIG. 2A). Adjustment of the seat locking lever 159 can cause a corresponding movement in the locking hook 161. The seat locking lever 159 and the locking hook 161 can be spring-biased in the locked position by a spring 163. In one example, the spring 163 is a torsion spring; however, other types of springs may alternatively be used.

In the locked position, the locking hook 161 engages the hook catch member 157 and prevents the booster seat base 100 from being adjusted from the in-use configuration to the collapsed configuration. As a user applies an upward force on the free end of the seat locking lever 159 to lift and rotate the seat locking lever 159 up from a top surface of the third seat member 120, the locking hook 161 rotates and disengages from the hook catch member 157 on the center link member 139. Once the locking hook 161 disengages from the hook catch member 157, the booster seat base 100 can be adjusted from the in-use configuration to the collapsed configuration. While not shown, the seat locking lever 159 can also include webbing or a strap attached to the seat locking lever 159 and extending out of the soft goods covering the third seating member 120, which can be used by a user to pull and apply the upward force on the seat locking lever 159.

The collapsible child booster seat base 100 can also include one or more cup holders 134, 136. In one example embodiment, the cup holders 134, 136 can be constructed in the manner set forth in any of the examples in U.S. patent application Ser. No. 15/451,496, filed on Mar. 7, 2017, the entire contents of which are hereby incorporated herein by reference for all purposes. In other example embodiments, the one or more cup holders 134, 136 can be rotatably coupled to the booster seat base 100. For example, a first cup holder 134 can be rotatably coupled to the first side base 112 and configured to rotate about a vertical or substantially vertical axis from a use position to a stored position and vise-versa. Further, a second cup holder 136 can be rotatably coupled to the second side base 114 and configured to rotate about a vertical or substantially vertical axis from a use position to a stored position. In one example, at least a portion of each cup holder 134, 136 can be formed from hard plastic. Further, each cup-holder, in the stored position can be stored all or at least partially within an exterior perimeter of the seat support frame 102.

The collapsible child booster seat base 100 can also include one or more tab members or protrusions 148, 152 coupled to or integrally formed with the booster seat base 100 (e.g. the seat support frame 102 (e.g., the first side base 112 and the second side base 114)). In one example embodiment, each tab member 148, 152 can be disposed along and extend perpendicularly or substantially perpendicularly out from the rear side of the booster seat base 100 (e.g., the rear side of each corresponding first side base 112 and second side base 114) to a free end 160 of the tab member 148, 152. In one example, two tab members 148, 152 are provided along the rear side of the booster seat base 100. However, greater or fewer tabs may be provided along the rear side of the booster seat base 100 in other example embodiments. Each tab member 148, 152 can be sized and shaped to be removably coupled to a corresponding receiving recess on the booster seat back as discussed below. In one example, each tab member 148, 152 can be a cube or a rectangular cuboid that extends generally in a horizontal manner out from the rear side of the booster seat base 100. In certain example embodiments, each tab member 148, 152 can have at least a limited degree of rotational freedom with respect to the remainder of the booster seat base 100. For example, each tab member 148, 152 can be rotatably coupled to the booster seat base 100 (e.g., the respective first side base 112 and second side base 114) by way of a hinge pin 170, hinge or other rotational mechanism. In this example embodiment, each tab member 148, 152 can be rotatable either up or down from a substantially horizontal position to anywhere in a range of substantially 0 degrees to substantially 45 degrees up or down from the substantially horizontal position and more preferably anywhere in the range of substantially 0 degrees to substantially 25 degrees up or down from the substantially horizontal position. Providing the tab member 148, 152 with a degree of freedom with respect to the remainder of the booster seat base 100 can help ensure that the booster seat back conforms better with the vehicle seat back 250 to limit any air gap or undesired spacing between the booster seat back and the vehicle seat back 250.

In certain example embodiments, each tab member 148, 152 can be hollow or include a hollowed out portion configured to receive a spring-loaded locking member 150, 154, as shown in FIG. 1E. In one example, the spring-loaded locking member 150, 154 can be disposed along a top side 174 of the tab member 148, 152. The spring-loaded locking member 150, 154 can include an adjustable lock engagement wall 176 that is capable of rotating or moving vertically up and down in direction W (along with all or a portion of the rest of the locking member 150, 154) from a first position, wherein the adjustable lock engagement wall 176 is disposed above the top side 174 of the tab member 148, 152 (as shown in FIG. 1E) to a second position, where the adjustable lock engagement wall 176 is at least partially, and in some cases fully, below the top side 174 of the tab member 148, 152 and positioned within the hollowed out portion of the tab member 148, 152, and subsequently back to the first position. In one example, embodiment, the spring-loaded locking member 150, 154 is movably coupled to the tab member 148, 152 and the entire locking member 150, 154 moves vertically up and down in the directions W, from the first position to the second position and vice-versa, with respect to the particular tab member 148, 152 and can be spring-biased in the first position. In another example embodiment, the adjustable lock engagement wall 176 can adjust from the first position to the second position and vice-versa by rotating about a hinge 156 disposed adjacent an end of the spring-loaded locking member 150, 154 opposite the adjustable lock engagement wall 176 in one example embodiment.

In one example, the spring-loaded locking member 150, 154 can be spring-biased into the first position, as shown in FIG. 1E, via a spring 158 (e.g., a compression spring or torsion spring) or other biasing mechanism which can be positioned within the hollow portion of the tab member 148, 152 and/or along the hinge 156 or another area within the hollow portion of the tab member 148, 152. In one example, the spring 158 can be coupled to a portion of the spring-loaded locking member 150, 154, such as along the bottom side of the spring-loaded locking member 150, 154. The spring-loaded locking member 150, 154 can also include a compression surface 178 disposed along a top side of the locking member 150, 154 between the adjustable lock engagement wall 176 and the fixed end adjacent the hinge 156 and can be downwardly sloped from the adjustable lock engagement wall 176 to the fixed end 156. In one example, applying a downward force along the compression surface 178 will cause the entire spring-loaded locking member 150, 154 to move vertically downward in the direction W into the hollow portion of the respective tab member 148, 152. In another example embodiment, applying a downward force along the compression surface 178 will cause the locking member 150, 154 to rotate about the hinge 156 and cause the adjustable lock engagement wall 176 to move in the downward direction W into the hollow portion of the respective tab member 148, 152. The spring-loaded locking member 150, 154 can have any shape and size and in particular can be sized and shaped to abut a corresponding locking interface wall 365*a* or 365*b* (not shown) (FIG. 3C) in a corresponding receiving member on the booster seat back as discussed below. In one example embodiment, the spring-loaded locking member 150, 154 can be generally shaped as a triangular prism; however, other shapes, including but not limited to a hemispherical or spherical ball or portion thereof for receipt within a secondary volume having a corresponding partial spherical shape, are within the spirit and scope of this disclosure.

Figure 2C:
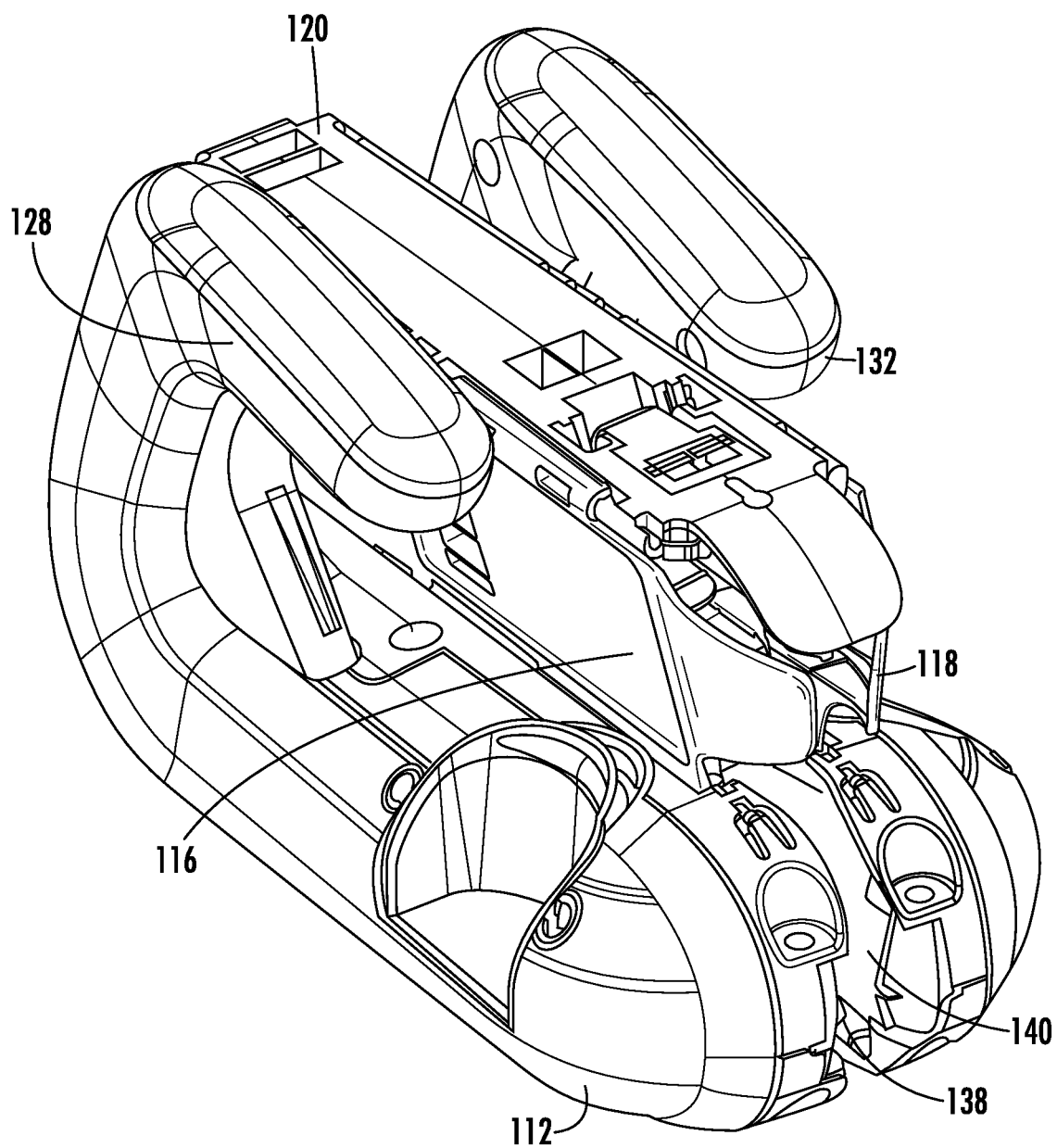

FIGS. 2A-2C are various views of the collapsible child booster seat base 100 of FIGS. 1A-E in the process of being adjusted from the unfolded, in-use configuration to the folded configuration, in accordance with one example embodiment of the disclosure. Referring now to FIGS. 1A-2C, a user can manually adjust the seat lock lever 159 up from a top surface of the third seat member 120, which causes the locking hook 161 to rotate and disengage from the hook catch member 157 on the center link member 139. In one example, the user can grip the free end of the seat lock lever 159 to lift the lever 159 and cause the lever 159 to rotate about an axis to unlock the booster seat base 100. In another example embodiment, webbing (e.g., a tether or strap) can be coupled to the lever 159 (e.g., the free end of the lever 159) and can be grasped and pulled by the user to cause the seat lock lever 159 to lift and rotate about the axis and unlock the booster seat base 100.

Once the locking hook 161 rotates with the seat locking lever 159 and disengages from the hook catch member 157, the booster seat base 100 is unlocked and can be adjusted from the in-use configuration to the collapsed configuration. As shown in FIG. 2B, as the third seating member 120 moves vertically upward in the direction C, the first side base 112 moves in the direction B and the second side base 114 moves in the direction A towards one another, the center link member 139 moves in the direction X generally towards the rear end of the seat support frame 102, the first end of the first rotating member 138 rotates in the direction L about the first vertical or substantially vertical axis defined by an axis though the attachment point 191, the first end 140*a* of the second rotating member 140 rotates in the direction M about the third vertical or substantially vertical axis defined by an axis through the attachment point 193, the first end 142*a* of the third rotating member 142 rotates in the direction L about the fifth vertical or substantially vertical axis defined by an axis through the attachment point 195, the first end 144*a* of the fourth rotating member 144 rotates in the direction M about the seventh vertical or substantially vertical axis defined by an axis through the attachment point 197, the first lateral edge 116*a* of the first seating member 116 rotates in the direction F and the first lateral edge 118*a* of the second seating member 118 rotates in the direction G away from one another. In embodiments where there are only the first seating member 116 and the second seating member 118, the second lateral edges 116*b*, 118*b* are rotatably coupled to one another and the connection point moves vertically in the direction C.

As best seen in FIG. 2C, rotation continues towards the collapsed configuration until the first seat member 116 is adjusted from a substantially horizontal position to a substantially vertical position and the second seat member 118 is moved from a substantially horizontal position to a substantially vertical position, a portion of the first rotating member 138 is received within the first interior cavity 141, a portion of the second rotating member 140 is received within the second interior cavity 145, a portion of the third rotating member 142 is received within the third interior cavity 143, a portion of the fourth rotating member 144 is received within the fourth interior cavity 147, a portion of the first tab member can be received within the first aperture 153 of the retaining tab 151, and a portion of the second tab member 199 can be received within the second aperture 155 of the retaining tab 151. The overall width of the booster seat base 100 is reduced when the booster seat base 100 is adjusted from the use configuration to the collapsed configuration, while the depth of the booster seat base 100 remains substantially unchanged. The portion of the first tab member being received within the first aperture 153 of the retaining tab 151 and the portion of the second tab member 199 being received within the second aperture 155 of the retaining tab 151 can lock the booster seat base 100 into the collapsed configuration. The user can then apply a force on the base 100 by pulling the first side base 112 in the direction A and the second side base 114 in the direction B and apart from one another to cause the first tab member to flex and exit the first aperture 153 and cause the second tab member 199 to flex and exit the second tab aperture 155 to unlock the booster seat base 100 from the collapsed configuration. The first 138, second 140, third 142, and fourth 144 rotating members will then rotate opposite of how they rotated from the in-use configuration to the collapsed configuration, the center link member 139 will move in the direction opposite the X direction, the third seating member will move generally vertically downward in the direction opposite the direction C, and the first seating member 116 and second seating member 118 will rotate opposing the directions they rotated from the in-use configuration to the collapsed configuration until they are substantially back in a horizontal orientation to move the seat back from the collapsed configuration to the in-use configuration.

The collapsible child booster seat base 100 can be made from metal, plastic, alloys, composites, or a combination thereof, and, in certain example embodiments, many parts of the seat can be made of molded plastic.

FIGS. 3A-E provide various views of an example child safety seat or car booster seat with a booster seat back 200 that is detachable from and capable of being reattached to the booster seat base 100, according to one example embodiment of the disclosure. In one example, the booster seat base 100 is substantially as shown and described in FIGS. 1A-D and the associated text above. Referring now to FIGS. 1A-D and 3A-E, the example car booster seat can include a booster seat base 100 and a booster seat back 200. The booster seat base 100 is removably coupled to the booster seat back 200 via one or more coupling means as described in greater detail below. Each of the booster seat base 100 and booster seat back 200 can be made from plastic (e.g., molded plastic), metal, alloys, composites, or a combination thereof.

Figure 3A:
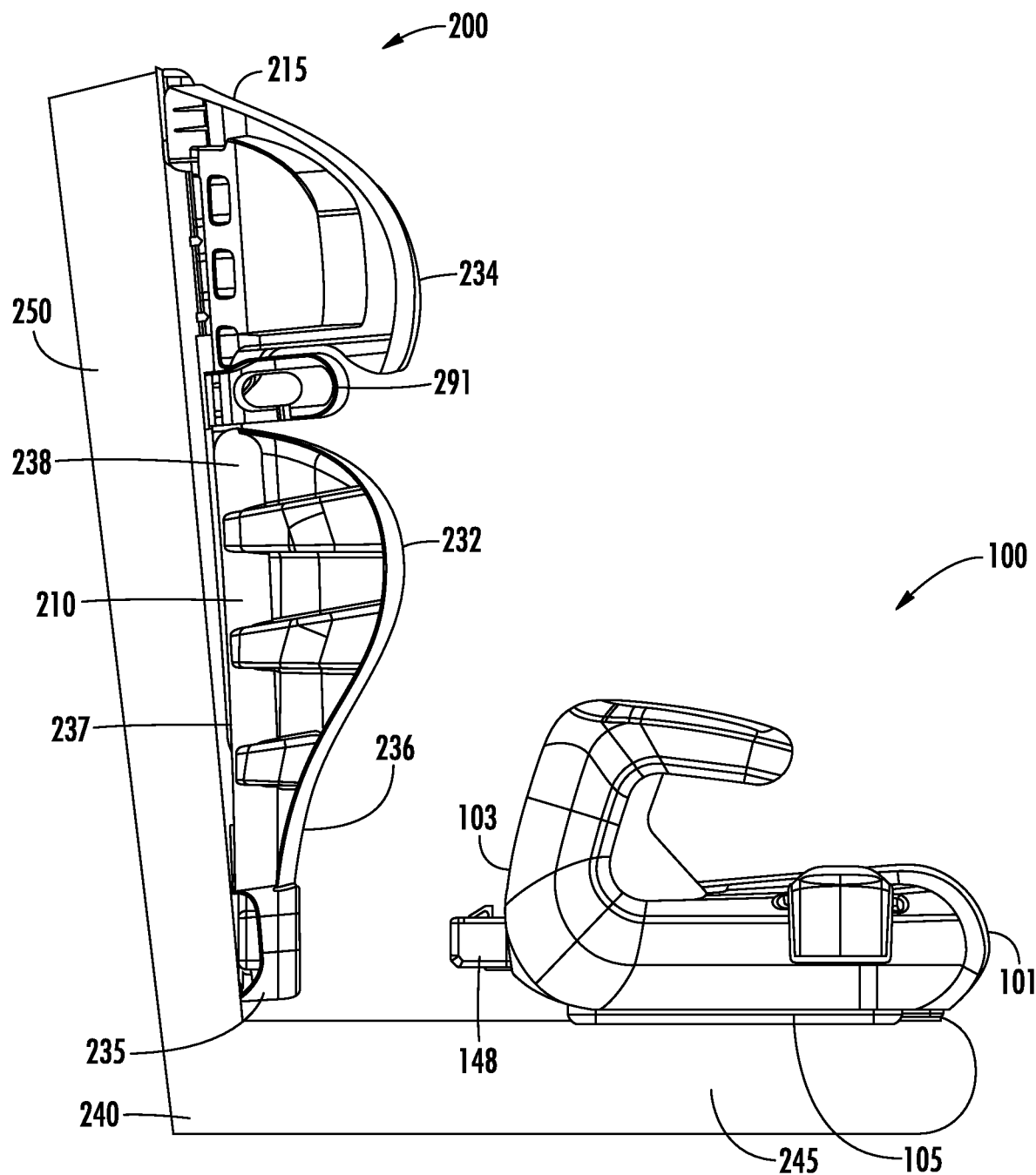
FIG. 3A is a side elevation view of one example of a child safety seat with the booster seat base detached from the booster seat back and constructed in accordance with one example embodiment of the disclosure.

The booster seat base 100 can include a front side 101 and opposing back or attachment side 103, a bottom side 105, and an opposing seating surface 106. The seating surface 106 or top side of the booster seat base 100 can be made up of the first seating member 116, second seating member 118, and third seating member 120, and can include padding and/or a soft goods covering on all or a portion of the seating surface 106 to provide a seating area for a child. In one example, the soft goods covering can be any one or more of fabric, leather, polyurethane, padding material or any other form of material. In one example embodiment, the seating surface 106 can be sloped downward from the front side 101 towards the back side 103. This slope can be constant or variable and can help to angle a child on the booster seat base 100 towards the booster seat back 200 or the seat back 250 of the automobile or other location of the seat 240. The bottom side 105 can have at least a portion that is a flat or substantially flat bottom surface that is configured to be placed on and rest upon the automobile seat base 245, as shown in FIG. 3A. In certain example embodiments, the bottom side 105 can also include friction increasing elements to reduce or prevent the bottom side 105 from sliding along the top surface of the automobile seat base 245. In certain example embodiments, in addition to being removably coupled, the booster seat back 200 may also be rotatable with respect to the booster seat base 100 from a vertical position, in which the booster seat back 200 extends orthogonal or substantially orthogonal to a plane defined by the bottom side 105 of the booster seat base 100, to an angled position anywhere in the range of 1-60 degrees from the substantially vertical position.

As discussed above with regard to FIGS. 1A-D, the booster seat base 100 can also include one or more tab members 148, 152 coupled to or integrally formed with the booster seat base 100. In one example embodiment, each tab member 148, 152 can be disposed along and extend perpendicularly or substantially perpendicularly out from the rear side 103 of the booster seat base 100. While two tab members 148, 152 are shown in the example, greater or fewer tab members may be provided along the rear side 103 of the booster seat base 100 in other example embodiments. Each tab member 148, 152 can be sized and shaped to be removably coupled to a corresponding locking cavity or member on the booster seat back 200.

The booster seat back 200 can include a back base 210 having a bottom end 235, an opposing top end 238, a front surface 236 and an opposing rear surface 237. The front surface 236 of the booster seat back base 210 can include padding and/or a soft goods covering on all or a portion of the front surface 236 to provide a back rest for a child. In one example, the soft goods covering can be any one or more of fabric, leather, polyurethane, padding material or any other form of material. A head rest 215 can be disposed along and/or removably coupled to the top end 238 of the booster seat back base 210. In certain example embodiments, the head rest 215 may be vertically adjustable with respect to the booster seat back base 210 to accommodate children of differing heights. In some example embodiments, the booster seat back base 210 and/or the head rest 215 may contain lateral supports 232, 234 extending from the booster seat back base 210 and/or headrest 215 to help keep the child securely positioned during lateral acceleration or deceleration. The back surface 237 can be configured to abut the automobile seat back 250 when the car booster seat is in use. Further, when detached from the booster seat base 100, the booster seat back 200 can be held in position against the automobile seat back 250 by an automobile seat belt coupled to a seat belt buckle.

Figure 3B:
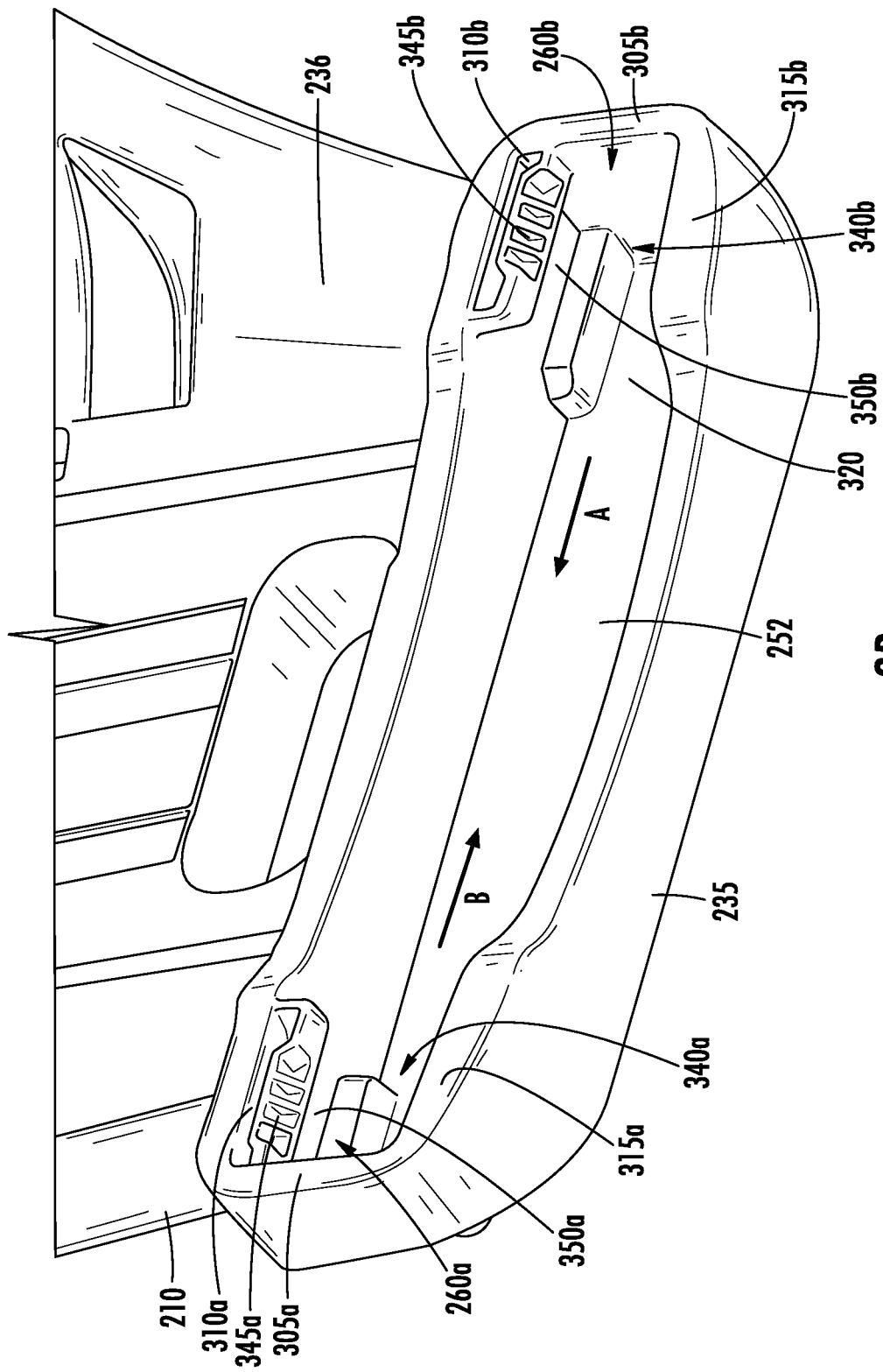
FIG. 3B is a partial perspective view of the booster seat back including tab receiving cavities, in accordance with one example embodiment of the disclosure.
Figure 3C:
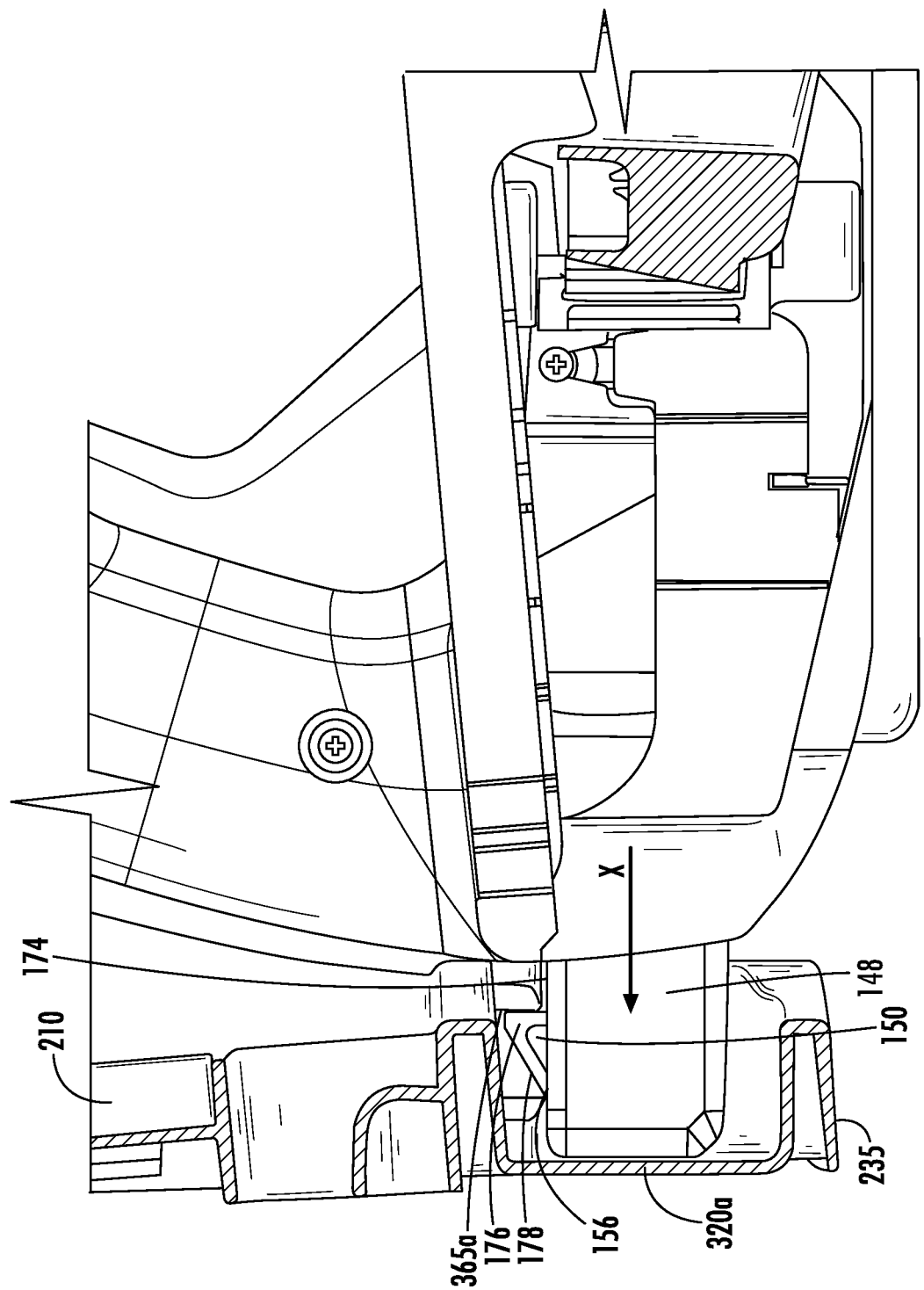
FIG. 3C is a partial elevation view of one of the connection interfaces between the booster seat base and the booster seat back of the child safety seat in a coupled configuration, in accordance with one example embodiment of the disclosure.

The booster seat back 200 can also include a bottom member 252 extending across all or at least a portion of the bottom end 235 of the booster seat back. The front facing side of the bottom member 252 can include a recessed area that includes one or more tab receiving cavities 260a, 260b coupled to or integrally formed with the bottom member 252. In one example embodiment, each tab receiving member 260a, 260b can be disposed within the recessed area of the bottom member. In another example embodiment, the bottom member 252 can be replaced with a pair of tab receiving members that extend down from a bottom edge of the booster seat back 200 along the bottom end 235 of the booster seat back 200. In one example, the number of tab receiving cavities or members 260a, 260b is the same as the number of tab members 148, 152. For example, as shown in FIG. 3B, two tab receiving cavities 260a, 260b, are provided adjacent opposing ends of the bottom member 252 of the booster seat back 200 to receive two corresponding tab members 148, 152. However, greater or fewer tab receiving cavities 260a, 260b may be provided along or disposed within the bottom member 252 of the booster seat back 200 in other example embodiments. Each tab receiving cavity 260a, 260b can include an opening 340a, 340b or volume that is sized and shaped to receive therein a corresponding tab member 148, 152 from the booster seat base 100.

For example, as shown in FIG. 3B, each tab receiving cavity 260a, 260b can include or be defined by a corresponding side wall 305a, 305b having a top end and a distal bottom end extending generally vertically downward from the top end. In one example, each side wall 305a, 305b, is positioned along an exterior edge of the bottom member 252 to prevent the corresponding tab member 148, 152 from moving outward. Each tab receiving cavity 260a, 260b can further include or be defined by a corresponding top wall 310a, 310b coupled or integrally formed with the corresponding side wall 305a, 305b adjacent the top end and a corresponding opposing bottom wall 315a, 315b coupled or integrally formed with the corresponding side wall 305a, 305b adjacent the bottom end.

Each tab receiving cavity 260a, 260b can also include a rear wall 320 coupled to or integrally formed with the corresponding top 310a, 310b, bottom 315a, 315b, and side 305a, 305b walls. In one example embodiment, the rear wall 320 is the same for both tab receiving cavities 260a, 260b. In other example embodiments, separate rear walls 320 can be provided for each of the corresponding tab receiving cavities 260a, 260b. In one example, the side wall 305a, top wall 310a, bottom wall 315a and rear wall 320a define a cavity or volume 340a void of material in the tab receiving cavity 260a and configured to receive therein a corresponding tab member 148 and the side wall 305b, top wall 310b, bottom wall 315b and rear wall 320b define a cavity or volume 340b void of material in the tab receiving cavity 260b and configured to receive therein a corresponding tab member 152. For example, each tab receiving cavity 260a, 260b can include a corresponding entry passageway or opening along a front side of each tab receiving cavity 260a, 260b for receiving the corresponding tab member 148, 152 into the volume 340a, 340b and a corresponding exit passageway or opening along a side opposing the corresponding side wall 305a, 305b of the tab receiving cavity 260a, 260b where the corresponding tab member 148, 152 exits the volume 340a, 340b of the tab receiving cavity 260a, 260b.

Each tab receiving cavity 260a, 260b can also include an angled or beveled edge member 345a, 345b disposed along a front side of the corresponding top wall 310a, 310b. Each beveled edge 345a, 345b can extend at an acute angle, such as between substantially 5 degrees to substantially 85 degrees down from the corresponding top wall 310a, 310b generally towards the rear wall 320 and can be configured to contact and provide a downward force on the compression surface 178 of the spring-loaded locking member 150, 154 when the tab members 148, 152 are being inserted into the corresponding volumes 340a, 340b of the tab receiving cavities 260a, 260b in the entry passageway in the direction X (see FIG. 3C).

Each tab receiving cavity 260a, 260b can also include secondary volumes 350a, 350b for receiving all or a portion of the corresponding spring-loaded locking member 150, 154 when it is in the first position. The secondary volumes 350a, 350b can be defined by a top wall and the locking interface wall 365a, 365b and can be in communication with or otherwise an extension of the corresponding volume 340a, 340b. Each locking interface wall 365a, 365b can be a vertical or substantially vertical wall configured to abut the adjustable lock engagement wall 176 of the corresponding spring-loaded locking member 150, 154. Each tab receiving cavity 260a, 260b can also include a compression ceiling extending from the corresponding beveled edge 345a, 345b to the locking interface wall 365a, 365b. In one example, the compression ceiling is a horizontal surface that is configured to force the compression surface 178 of each spring-loaded locking member 150, 154 downward as the tab member 148, 152 is being received into the corresponding tab receiving cavity 260a, 260b.

In certain alternate example embodiments, each tab receiving cavity 260a, 260b can also include one or more lock releasing members (not shown) movably coupled to the bottom member 252 and configured to move from a first position, disposed within one or more of the walls of the tab receiving cavities 260a, 260b to a second position in which at least portion of the lock releasing member is moved into the secondary volume 350a, 350b of the tab receiving cavity 260a, 260b. The lock release member can be configured to apply a downward force onto the spring-loaded locking member 150, 154 to force the spring-loaded locking member 150, 154 into the hollow portion of the corresponding tab member 148, 152 so that each corresponding tab member 148, 152 can be removed from the corresponding tab receiving cavity 260a, 260b. The lock releasing member can be directly or indirectly coupled to a release button or tab which can be disposed on the bottom member 252 or another portion of the booster seat back 200. A user can activate the release button or tab to cause the lock release member to move from the first position to the second position in order to release the tab members 148, 152 from the tab receiving cavities 260a, 260b. In one example, a single release button or tab is provided for each lock releasing member. In another example embodiment, a single release button or tab can activate all of the lock release members and cause them to move from the first position to the second position.

The child car booster seat can also include one or more elements that guide and position the automobile's three-point seatbelt (not shown). In one example embodiment, a shoulder belt guide 291 may be coupled or integrally formed with at least a portion of the booster seat back 200 or to the head rest 215 and can be positioned between the bottom end 235 of the booster seat back 200 and the top end 238 of the booster seat back 200 and/or the top of the head rest 215. In one example, the shoulder belt guide 291 is disposed adjacent a bottom side of the head rest 215. The shoulder belt guide 291 can include a channel, for example an oblong channel, that the seatbelt can pass freely therethrough. In some example embodiments, the outer wall of the shoulder belt guide 291 may have an opening or other break in the wall to allow the automobile seatbelt to be fed into the shoulder belt guide 291 while making it difficult for the automobile seatbelt to be unintentionally removed from the guide 291. Once the automobile seatbelt is in place, the shoulder belt guide 291 can maintain the shoulder belt in the proper position across the child's chest while seated on the booster seat base 100 and while still allowing the belt to be extended and retracted during buckling and unbuckling of the child into the child car booster seat. Other exemplary embodiments may utilize different shoulder belt guide configurations, for example, a strap with one end fixed to the booster seat back 200 may be looped over the automobile seatbelt with the other end removably snapped or coupled to the booster seat back 200. In other example embodiments, the shape of the headrest 215, booster seat back base 210, and/or lateral supports 232, 234 may provide an integrated pathway to guide and secure the automobile shoulder seatbelt.

In operation, a user, such as a parent or guardian, can couple the booster seat base 100 to the booster seat back 200 with a single hand by sliding the booster seat base 200 along the top surface of the automobile seat base 245 and towards the booster seat back 200. Each of the tab members 148, 152 can begin entering the corresponding tab receiving cavities 260a, 260b via the corresponding entry passageway. The spring-loaded locking member 150, 154 on each tab member 148, 152 can be slidably received along the corresponding beveled edge 345a, 345b and can be forced downward by the beveled edge 345a, 345b and the compression ceiling applying a downward force upon the compression surface 178 of each corresponding spring-loaded locking member 150, 154 and into the hollow portion 305 of the corresponding tab member 148, 152. Once the tab member 148, 152 is fully within the corresponding tab receiving cavity 260a, 260b, the corresponding spring-loaded locking members 150, 154 are no longer in contact with the beveled edge 345a, 345b or the compression ceiling and the spring biasing member 158 forces the corresponding spring-loaded locking member 150, 154 upward into the corresponding secondary volume 350a, 350b of each tab receiving cavity 260a, 260b and the tab members 148, 152 are prevented from exiting the tab receiving cavities 260a, 260b, through the entry passageway in the direction opposite the X direction by the corresponding lock-engagement wall 176 contacting the respective locking interface wall 365a, 365b.

Figure 3D:
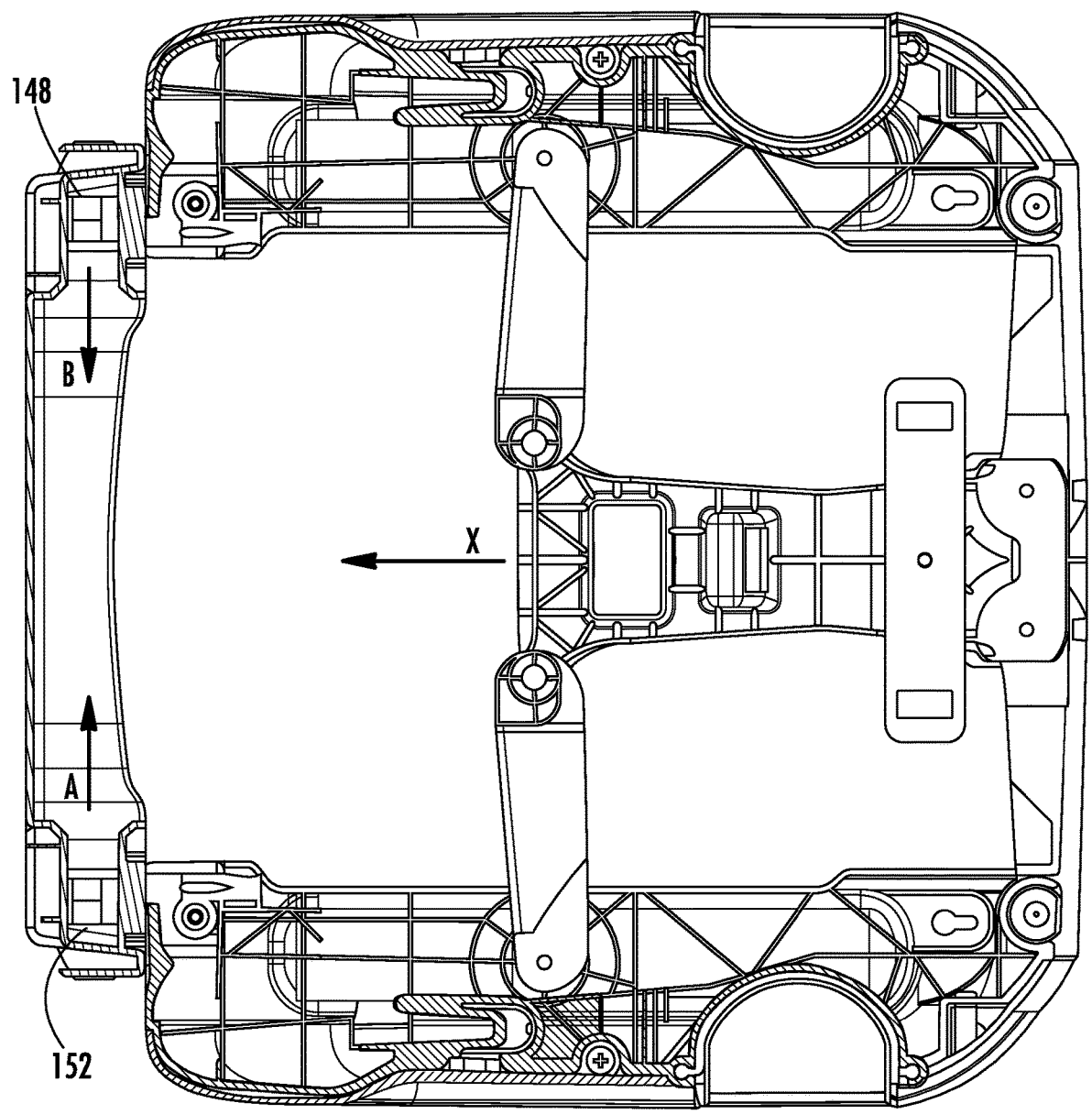
FIG. 3D is a partial bottom cross-sectional view of the connection interfaces between the booster seat base and the booster seat back of the child safety seat in a coupled configuration, in accordance with one example embodiment of the disclosure.
Figure 3E:
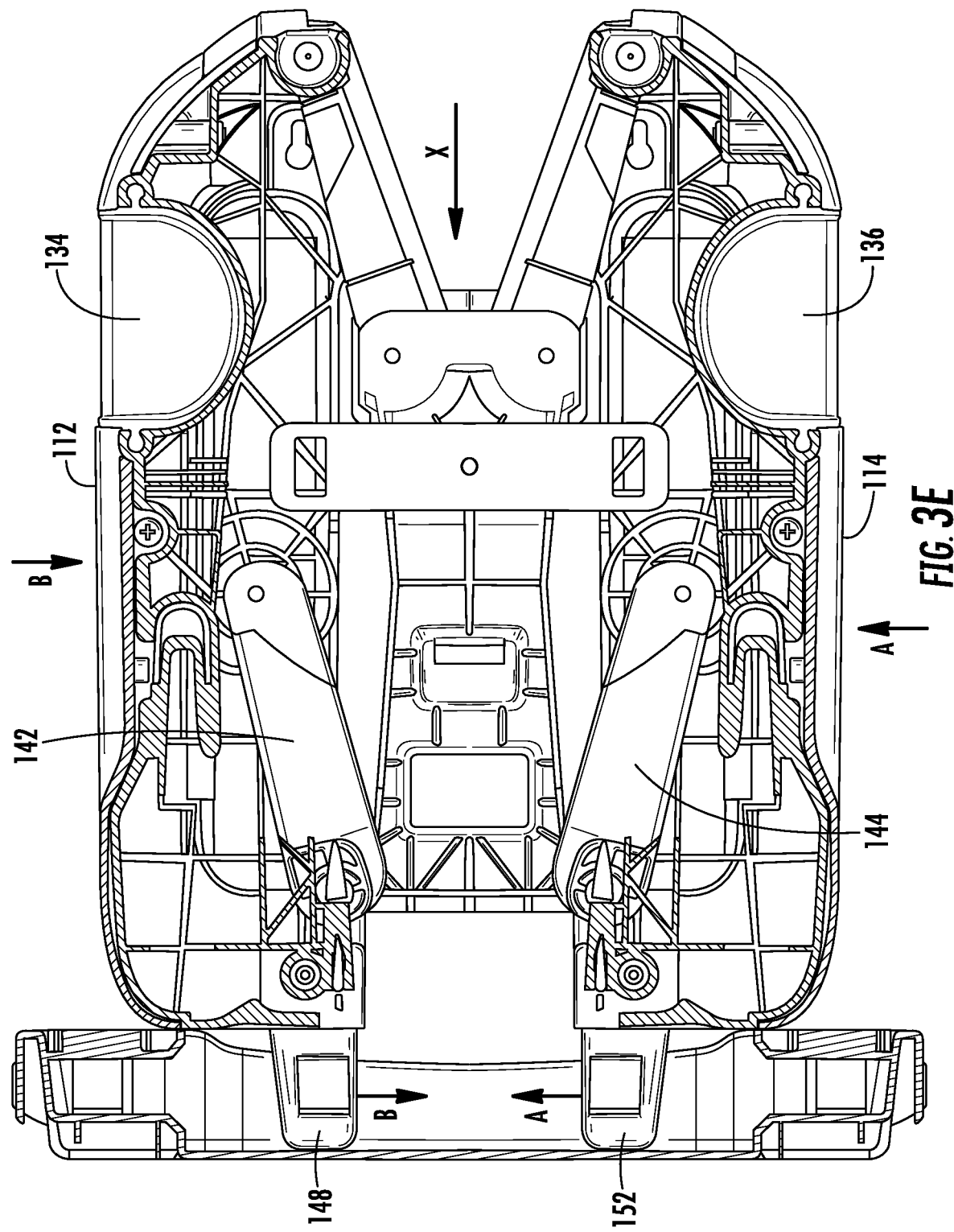
FIG. 3E is a partial bottom cross-sectional view of the connection interfaces between the booster seat base and the booster seat back of the child safety seat in a released or decoupled configuration, in accordance with one example embodiment of the disclosure.

As shown in FIGS. 3D-3E, in one example embodiment, decoupling the booster seat base 100 from the booster seat back 200 can be accomplished as part of the adjustment of the booster seat base 100 from an in-use configuration to a collapsed configuration. For example, as discussed with reference to FIGS. 2A-2C above, a user can manually adjust the seat lock lever 159 up from a top surface of the third seat member 120, which causes the locking hook 161 to rotate and disengage from the hook catch member 157 on the center link member 139. In one example, the user can grip the free end of the seat lock lever 159 to lift the lever 159 and cause the lever 159 to rotate about an axis to unlock the booster seat base 100. In another example embodiment, webbing (e.g., a tether or strap) can be coupled to the lever 159 (e.g., the free end of the lever 159) and can be grasped and pulled by the user to cause the seat lock lever 159 to lift and rotate about the axis and unlock the booster seat base 100.

Once the locking hook 161 rotates with the seat locking lever 159 and disengages from the hook catch member 157, the booster seat base 100 is unlocked and can be adjusted from the in-use configuration to the collapsed configuration. As shown in FIG. 3D-3E, as the center link member 139 moves in the direction X generally towards the rear end of the seat support frame 102, the first side base 112 moves in the direction B and the second side base 114 moves in the direction A, causing the tab member 148 to move in the direction B out of the tab receiving cavity 260a through the first exit passageway (an opening along the side of the tab receiving cavity 260a opposite the side wall 305a) and into the recessed opening of the bottom member 252 and causing the tab member 152 to move in the direction A out of the tab receiving cavity 260b through the second exit passageway (an opening along the side of the tab receiving cavity 260b opposite the side wall 305b) and into the recessed opening of the bottom member 252. As the recessed opening of the bottom member 252 inward of each tab receiving cavity 260a, 260b does not include the locking interface wall 365a, 365b to prevent the corresponding tab members 260a, 260b from moving in the direction opposite X, the tab members 260a, 260b can then be pulled (along with the remainder of the booster seat base 100) in the direction opposite the X direction to decouple the booster seat base 100 from the booster seat back 200.

While the example embodiment has been described with a particular form of tab member and tab receiving cavity, other types of tabs and tab receiving cavities or members could alternatively be used. For example, the tab could have a specific size and shape that is configured to be press fitted into a corresponding tab receiving cavity or member where it is held until a sufficient force is applied to pull the tab from the tab receiving cavity or member. This can be achieved, for example, by using a plastic tab that is not deformable and a tab receiving cavity or member that has at least a minimum amount of shape elasticity or resiliency, such that the tab is a little larger than the tab receiving cavity or member but the tab receiving cavity or member is configured to expand or spread apart slightly to receive the tab member therein and similarly to release the tab member when a sufficient force is applied.

In certain alternative embodiments, the booster seat base 100 can also include an activation device (not shown). The activation device can be a button, pull tab, switch, or other device. In certain example, embodiments, the activation device can be positioned along the front or side of the booster seat base 100. Alternatively, the activation device can be positioned along any other portion of the booster seat base 100. In one example embodiment, the activation device can be operably coupled to the tab members 148, 152. For example, engaging the activation device (e.g., pushing the button, pulling the pull tab, moving the switch, etc.) can cause the tab members 148, 152 to move from a first or attachment position to a second or release position. For example, as shown in FIG. 3E, engaging the activation device can cause each of the tab members 148, 152 to move inward in the corresponding directions A and B, without having to adjust the entire booster seat base 100 from the in-use configuration to the collapsed configuration and causing each of the tab members 148, 152 and corresponding spring-loaded locking members 150, 154 to exit from the corresponding receiving cavities 260a, 260b via the corresponding exit passageways. While the example embodiment of FIG. 3E shows the tab members 148, 152 moving inward towards one another, in other example embodiments, the tab members 148, 152 can alternatively move outward, away from one another in the directions opposite A and B respectively to exit the corresponding tab receiving cavities 260a, 260b. In yet another alternative embodiment, engagement of the activation device can cause each of the spring-loaded locking members 150, 154 to be retracted downward into the corresponding hollow portions of the respective tab members 148, 152 until the spring-loaded locking members 150, 154 no longer make contact with the locking engagement wall 176 of each corresponding tab receiving cavity 260*a*, 260*b* and the tab members 148, 152 can be removed from the corresponding tab receiving cavities 260*a*, 260*b* through the corresponding entry passageways. In one example, the activation device may be operably coupled to the tab members 148, 152 via one or more rigid mechanical members. In another example embodiment, the activation device may be operably coupled to the tab members 148, 152 via one or more wires and pulleys disposed under the seating surface.

Further, the tab members 148, 152 may or may not be spring-biased into the first or attachment position via one or more springs or other biasing mechanisms. In example embodiments where the tab members 148, 152 are part of a collapsible seat base 100, such as that described above, movement of the booster seat base 100 from the collapsed configuration to the use configuration can move the tab members 148, 152 back to the first position.

In addition, while the example embodiment teaches the booster seat base 100 including the tab members 148, 152 and the booster seat back 200 including the tab receiving cavities 260*a*, 260*b*, in other example embodiments the configuration can be switched such that the booster seat base 100 includes the tab receiving cavities 260*a*, 260*b* and the booster seat back 200 includes the tab members 148, 152. The activation member may be a part of the booster seat back 200 (e.g., disposed on one of the lateral sides of the booster seat back 200 or along the top of the booster seat back 200) and operably coupled to the tab members via one or more wires and pulleys and engaging the activation member may move the tab members from a first position to a second position similar to that described above but along the bottom side 235 of the booster seat back 200.

In an alternate example embodiment, the collapsible child booster seat can include a seat support frame and a seating surface. In one example, the seat base can be constructed in substantially the same manner as the seat support frame 102 of FIG. 1A. The seat can also include a first armrest coupled to a first side of the seat support frame and a second armrest coupled to a second side of the seat support frame.

The seating surface can include a first seating member and a second seating member. While the example embodiment describes two seating members, the number of seating members could be more than two. For example, the seat could include three seating members that function substantially similar to that shown and described in FIGS. 1A-E above. Each seating member can have a flat, substantially flat, or curved top surface. In one example embodiment, each of the seating members are constructed from plastic and molded into the desired shape. Further each of the seating members can also include padding and/or other soft goods (e.g., fabric, leather, soft plastic, etc.) disposed along at least the top surface of each corresponding seating member.

In one example embodiment, the first seating member can extend generally from the front end of the seat towards the rear end of the seat. The first seating member can be rotatably coupled along a first lateral edge to a first side of the seat support frame and can be rotatably coupled along an opposing second lateral edge to the second seating member. In one example embodiment, the first seating member can be configured to rotate about an axis disposed generally along the first lateral edge and defined by the coupling of the first seating member to the first side of the seat support frame. In one example, the first seating member can be rotatably coupled to the first side of the seat base via a pin, axle, hinge, or other rotating means known to those of ordinary skill in the art. In addition, the first seating member can be rotatably coupled to the second seating member via a pin, axle, hinge, or other rotating means known to those of ordinary skill in the art.

In certain example embodiments, the first seating member can also include an aperture extending along a portion of the top surface and providing a passageway through the first seating member from the top surface through the bottom surface. In one example, the aperture can be sized and shaped to receive a carry handle therethrough for carrying the seat in the collapsed configuration. In one example, the handle can be coupled to or integrally formed with the hinge or other rotating means that rotatably couples the first seating member and the second seating member. While the example embodiment describes the aperture in the first seating member, in alternative embodiments, the aperture can be provided in the second seating member or in a portion of both the first seating member and the second seating member. In certain example embodiments, the first seating member is made of plastic. However, other materials known to those of ordinary skill in the art may be substituted for plastic.

In one example embodiment, the second seating member can extend generally from the front end of the seat towards the rear end of the seat. The second seating member can be rotatably coupled along a first lateral edge to a second side of the seat support frame and can be rotatably coupled along an opposing second lateral edge to the first seating member. In one example embodiment, the second seating member can be configured to rotate about an axis disposed generally along the first lateral edge and defined by the coupling of the second seating member to the second side of the seat support frame. In one example, the second seating member can be rotatably coupled to the second side of the seat support frame via a pin, axle, hinge, or other rotating means known to those of ordinary skill in the art. In certain example embodiments, the second seating member is made of plastic. However, other materials known to those of ordinary skill in the art may be substituted for plastic.

To move the seat from the use configuration to a collapsed configuration, the first side of the seat support frame is moved in the direction B and the second side of the seat base is moved in the direction A towards one another similar to that shown an described in FIGS. 2A-C. The first seat member rotates in the counterclockwise direction and the second seat member rotates in the clockwise direction away from one another. Rotation continues towards the collapsed configuration until the first seat member is adjusted from a substantially horizontal position to a substantially vertical position and the second seat member is moved from a substantially horizontal position to a substantially vertical position, similar to that shown in FIG. 2C. The overall width of the seat is reduced when the seat is adjusted from the in-use configuration to the collapsed configuration, while the depth of the seat remains substantially unchanged. Further, the carry handle can extend vertically up from the first and/or second seat member in the collapsed configuration to allow for easy carrying of the seat base by the user.

The seat can include one or more lockouts that lock the seat into either or both of the use configuration and the collapsed configuration similar to those shown and described in FIGS. 1A-E. Further, the seat can be adjusted from the collapsed configuration to the in-use configuration by moving the first side of the seat base in a direction opposite the B direction and moving the second side of the seat base in a direction opposite the A direction and away from one another. The first seat member can rotate in the clockwise direction and the second seat member can rotate in the counterclockwise direction until the top surfaces of the first seat member and second seat member are substantially flush with one another.

Although child booster seat features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A child safety seat comprising:
    a seat back comprising a top end, a bottom end, and a first tab receiving cavity disposed along the bottom end of the seat back; and
    a seat base configured to be removably coupled to the seat back and comprising a front end, an opposing back end, a seating surface disposed between the front end and the back end, and a first tab member extending from the back end and comprising:
        a first member comprising a hollow cavity;
        a locking member at least partially disposed within the hollow cavity and configured to removably couple the first tab member to the first tab receiving cavity; and
        a spring-biasing means operably coupled to the locking member, wherein the spring-biasing means biases the locking member in a direction out from the hollow cavity of the first member.

2. The child safety seat of claim 1, wherein the seat base further comprises:
    a second tab member separate from the first tab member;
    a first lateral side member extending from the front end to the back end; and
    a second lateral side member extending from the front end to the back end,
    wherein the first tab member is disposed along the back end of the seat base adjacent the first lateral side member and the second tab member is disposed along the back end of the seat base adjacent the second lateral side member.

3. The child safety seat of claim 2, wherein the seat back further comprises a second tab receiving cavity disposed along the bottom end of the seat back and separate from the first tab receiving cavity, wherein at least a portion of the second tab member is configured to be removably coupled to the second tab receiving cavity.

4. The child safety seat of claim 3, wherein the first tab receiving cavity comprises:
    an entry passageway disposed along a first side of the first tab receiving cavity; and
    an exit passageway disposed along a second side of the first tab receiving cavity different from the first side of the first tab receiving cavity,
    wherein the first tab member is configured to be coupled to the first tab receiving cavity by passing through the entry passageway and to be decoupled from the first tab receiving cavity by passing through the exit passageway.

5. The child safety seat of claim 4, wherein the second tab receiving cavity comprises:
    a second entry passageway disposed along a first side of the second tab receiving cavity; and
    a second exit passageway disposed along a second side of the second tab receiving cavity different from the first side of the second tab receiving cavity,
    wherein the second tab member is configured to be coupled to the second tab receiving cavity by passing through the second entry passageway and to be decoupled from the second tab receiving cavity by passing through the second exit passageway.

6. The child safety seat of claim 1, wherein the first tab member further comprises:
    the first member further comprising a top surface, and an aperture through the top surface and in communication with the hollow cavity;
    wherein the locking member is configured to extend through the aperture above the top surface.

7. The child safety seat of claim 6, wherein the spring-biasing means biases the locking member to extend up through the aperture.

8. The child safety seat of claim 1, wherein the seat base further comprises:
    a seat support frame comprising;
        a first side base extending from the front end to the back end;
        a second side base extending from the front end to the back end; and
        a center member disposed between the first side base and second side base and rotatably coupled to the first side base and the second side base;
    wherein the seating surface comprises:
        a first seating member rotatably coupled to the first side base;
        a second seating member rotatably coupled to the second side base; and
        a third seating member disposed between the first seating member and the second seating member and rotatably coupled to the first seating member and the second seating member;
    wherein the seat base is configured to be adjusted from an in-use configuration to a collapsed configuration.

9. A child safety seat comprising:
    a booster seat base comprising:
        a seat support frame comprising;
            a first side base;
            a second side base; and
            a center member rotatably coupled to the first side base and the second side base;
        a seating surface comprising:

a first seating member rotatably coupled to the first side base;
a second seating member rotatably coupled to the second side base; and
a third seating member disposed between the first seating member and the second seating member and rotatably coupled to the first seating member and the second seating member.

10. The child safety seat of claim 9, wherein the booster seat base is configured to be adjusted from an in-use configuration to a collapsed configuration.

11. The child safety seat of claim 10, wherein the first seating member comprises a first top surface and the second seating member comprises a second top surface, wherein in the in-use configuration, the first top surface and second top surface are substantially horizontal and in the collapsed configuration, the first top surface and second top surface are substantially vertical.

12. The child safety seat of claim 9, wherein the booster seat base has a first overall width in the in-use configuration and a second overall width in the collapsed configuration, wherein the first width is greater than the second width.

13. The child safety seat of claim 9, wherein the third seating member comprises a first lateral side rotatably coupled to the first seating member and a second lateral side rotatably coupled to the second seating member.

14. The child safety seat of claim 9, wherein the seat support frame further comprises:
a first rotatable member comprising a first end and a distal second end, the first end rotatably coupled to the first side base and the second end rotatably coupled to the center member;
a second rotatable member comprising a third end and a distal fourth end, the third end rotatably coupled to the second side base and the fourth end rotatably coupled to the center member.

15. The child safety seat of claim 14, wherein the seat support frame further comprises:
a third rotatable member comprising a fifth end and a distal sixth end, the fifth end rotatably coupled to the first side base and the sixth end rotatably coupled to the center member;
a fourth rotatable member comprising a seventh end and a distal eighth end, the seventh end rotatably coupled to the second side base and the eighth end rotatably coupled to the center member.

16. The child safety seat of claim 9, wherein the seating surface further comprises a locking lever movably coupled to the seating surface and configured to rotate from a locked position to an unlocked position, the locking lever comprising a locking hook configured to engage at least a portion of the center member in the locked position.

17. The child safety seat of claim 16, further comprising a biasing means that spring-biases the locking lever in the locked position.

18. The child safety seat of claim 9, further comprising:
a seat back comprising:
a top end;
a bottom end;
a first tab receiving cavity disposed along the bottom end of the seat back; and
a second tab receiving cavity disposed along the bottom end of the seat back;
wherein the booster seat base further comprises:
a first tab member extending from a back end of the booster seat base and configured to be removably coupled to the first tab receiving cavity; and
a second tab member extending from the back end of the booster seat base and configured to be removably coupled to the second tab receiving cavity.

19. The child safety seat of claim 18, wherein each of the first tab member and second tab member comprises:
a first member comprising:
a plurality of outer walls defining a hollow cavity;
an aperture through a top wall of the plurality of walls;
a locking member at least partially disposed within the hollow cavity and configured to extend through the aperture above the top wall; and
a spring biasing means coupled to the locking member, wherein the spring biasing means biases the locking member to extend up through the aperture.

20. A child safety seat comprising:
a seat back comprising:
a top end;
a bottom end;
a first tab receiving cavity disposed along the bottom end of the seat back; and
a second tab receiving cavity disposed along the bottom end of the seat back;
a booster seat base comprising:
a seat support frame comprising:
a front end;
a distal back end;
a first tab member extending from the back end and configured to be removably inserted into the first tab receiving cavity; and
a second tab member extending from the back end and configured to be removably inserted in the second tab receiving cavity;
a seating surface disposed above at least a portion of the seat support frame and comprising:
a first seating member rotatably coupled to the first side base;
a second seating member rotatably coupled to the second side base; and
a third seating member disposed between the first seating member and the second seating member and rotatably coupled to the first seating member and the second seating member
wherein the booster seat base is configured to be adjusted from an in-use configuration, wherein the booster seat base has a first width, to a collapsed configuration, wherein the booster seat base has a second width, and wherein the first width is greater than the second width.

* * * * *